(12) United States Patent
Petersen et al.

(10) Patent No.: US 9,894,164 B2
(45) Date of Patent: Feb. 13, 2018

(54) COMPUTING SYSTEM WITH CONTROL MECHANISM AND METHOD OF OPERATION THEREOF

(71) Applicant: Samsung Electronics Co., Ltd., Suwon-si, Gyeonggi-Do (KR)

(72) Inventors: Nicolai Munk Petersen, San Jose, CA (US); Chris Turkstra, San Jose, CA (US); Daniel William Simmons, San Francisco, CA (US); Guy Bar-Nahum, Mill Valley, CA (US); Robin M. Tafel, San Francisco, CA (US); Seungeun Lee, Sunnyvale, CA (US); Kwame Ferreira, London (GB); Justin L. Gregg, Golden, CO (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 419 days.

(21) Appl. No.: 14/298,590

(22) Filed: Jun. 6, 2014

(65) Prior Publication Data

US 2014/0365671 A1    Dec. 11, 2014

Related U.S. Application Data

(60) Provisional application No. 61/832,105, filed on Jun. 6, 2013, provisional application No. 61/845,860, filed on Jul. 12, 2013.

(51) Int. Cl.
| | |
|---|---|
| *H04L 29/08* | (2006.01) |
| *H04W 4/02* | (2009.01) |
| *H04W 4/00* | (2009.01) |

(52) U.S. Cl.
CPC ............. *H04L 67/16* (2013.01); *H04W 4/021* (2013.01); *H04W 4/008* (2013.01); *H04W 4/026* (2013.01); *H04W 4/027* (2013.01)

(58) Field of Classification Search
USPC ........... 709/225; 715/736; 719/321; 345/591
See application file for complete search history.

(56) References Cited

U.S. PATENT DOCUMENTS

| | | | |
|---|---|---|---|
| 6,229,429 B1 * | 5/2001 | Horon ................... | G08B 25/14 340/286.01 |
| 8,737,289 B2 * | 5/2014 | Seo ........................ | H04L 5/001 370/315 |
| 2002/0004852 A1 * | 1/2002 | Sadovsky ............. | G06F 13/102 719/321 |

(Continued)

*Primary Examiner* — Tammy Nguyen
(74) *Attorney, Agent, or Firm* — IP Investment Law Group

(57) ABSTRACT

An computing system includes: a communication unit configured to receive a discovery request, including a client presence factor, having a scan pattern for discovering a target device; a control unit, coupled to the communication unit, configured to: determine a target device coordinate based on the discovery request for identifying a client device relative to the target device, determine a device connectivity based on the target device coordinate, the client presence factor, or a combination thereof for establishing a backhaul communication between the client device and the target device, and a user interface, coupled to the control unit, configured to present a device information based on a trust level for displaying the device information of the client device having the device connectivity of connected with the target device.

15 Claims, 10 Drawing Sheets

(56) References Cited

U.S. PATENT DOCUMENTS

| | | | | |
|---|---|---|---|---|
| 2002/0059474 A1* | 5/2002 | Camara | ............ | G06F 13/102 |
| | | | | 719/321 |
| 2005/0219258 A1* | 10/2005 | Stokes | ............ | H04N 1/00204 |
| | | | | 345/591 |
| 2008/0311894 A1* | 12/2008 | Klein | ............ | H04L 12/24 |
| | | | | 455/414.2 |
| 2010/0208985 A1* | 8/2010 | Lee | ............ | H04N 1/40012 |
| | | | | 382/163 |
| 2011/0145812 A1* | 6/2011 | Kong | ............ | H04N 1/00222 |
| | | | | 717/178 |
| 2012/0303459 A1* | 11/2012 | Stephens | ............ | H04W 8/005 |
| | | | | 705/14.64 |
| 2014/0057626 A1* | 2/2014 | Uelk | ............ | H04W 24/00 |
| | | | | 455/423 |
| 2015/0052443 A1* | 2/2015 | Funase | ............ | G06F 3/0484 |
| | | | | 715/736 |
| 2015/0134096 A1* | 5/2015 | Travers | ............ | B29C 67/0088 |
| | | | | 700/98 |

* cited by examiner

COMPUTING SYSTEM WITH CONTROL MECHANISM AND METHOD OF OPERATION THEREOF

CROSS-REFERENCE TO RELATED APPLICATION(S)

This application claims the benefit of U.S. Provisional Patent Application Ser. No. 61/832,105 filed Jun. 6, 2013, and the subject matter thereof is incorporated herein by reference thereto. This application claims the benefit of U.S. Provisional Patent Application Ser. No. 61/845,860 filed Jul. 12, 2013, and the subject matter thereof is incorporated herein by reference thereto.

TECHNICAL FIELD

An embodiment of the present invention relates generally to a computing system, and more particularly to a system for control mechanism.

BACKGROUND

Modern portable client and industrial electronics, especially client devices such as cellular phones, portable digital assistants, and combination devices are providing increasing levels of functionality to support modem life including location-based information services. Research and development in the existing technologies can take a myriad of different directions.

As users become more empowered with the growth of devices, new and old paradigms begin to take advantage of this new device space. There are many technological solutions to take advantage of this new device capability to communicate with other devices. One existing approach is to use device movement to provide access through a mobile device, such as a cell phone, smart phone, or a personal digital assistant.

Connection services allow users to create, transfer, store, and/or control information in order for users to create, transfer, store, and control in the "real world." One such use of personalized content services is to efficiently transfer or guide users to the desired product or service.

Thus, a need still remains for a computing system with control mechanism for aiding the connection to devices. In view of the ever-increasing commercial competitive pressures, along with growing client expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

SUMMARY

An embodiment of the present invention provides an computing system including: a communication unit configured to receive a discovery request, including a client presence factor, having a scan pattern for discovering a target device; a control unit, coupled to the communication unit, configured to: determine a target device coordinate based on the discovery request for identifying a client device relative to the target device, determine a device connectivity based on the target device coordinate, the client presence factor, or a combination thereof for establishing a backhaul communication between the client device and the target device, and a user interface, coupled to the control unit, configured to present a device information based on a trust level for displaying the device information of the client device having the device connectivity of connected with the target device.

An embodiment of the present invention provides an computing system including: a communication unit configured to: send a discovery request having a scan pattern with a scan dimension suited for a discovery context, receive a discovery communication, including a device connectivity, based on the discovery request, and a user interface, coupled to the communication unit, configured to present a device visualization based on discovery communication for displaying a target device discovered; and a control unit, coupled to the user interface, configured to: determine a channel type of a backhaul channel based on the discovery communication, and establish a backhaul communication based on the channel type for connecting a client device and the target device for the backhaul communication.

An embodiment of the present invention provides a method of operation of an computing system including: receiving a discovery request, including a client presence factor, having a scan pattern for discovering a target device; determining a target device coordinate with a control unit based on the discovery request for identifying a client device relative to the target device; determining a device connectivity based on the target device coordinate, the client presence factor, or a combination thereof for establishing a backhaul communication between the client device and the target device; and presenting a device information based on a trust level for displaying the device information of the client device having the device connectivity of connected with the target device.

An embodiment of the present invention provides a method of operation of an computing system including: sending a discovery request having a scan pattern with a scan dimension suited for a discovery context; receiving a discovery communication, including a device connectivity, based on the discovery request; presenting a device visualization based on discovery communication for displaying a target device discovered; determining a channel type of a backhaul channel with a control unit based on the discovery communication; and establishing a backhaul communication based on the channel type for connecting a client device and the target device for the backhaul communication.

An embodiment of the present invention provides a non-transitory computer readable medium including instructions for execution by a control unit including: a control unit comprising: receiving a discovery request, including a client presence factor, having a scan pattern for discovering a target device; determining a target device coordinate based on the discovery request for identifying a client device relative to the target device; determining a device connectivity based on the target device coordinate, the client presence factor, or a combination thereof for establishing a backhaul communication between the client device and the target device; and presenting a device information based on a trust level for displaying the device information of the client device having the device connectivity of connected with the target device.

An embodiment of the present invention provides a non-transitory computer readable medium including instructions for execution by a control unit including: sending a discovery request having a scan pattern with a scan dimension suited for a discovery context; receiving a discovery communication, including a device connectivity, based on the discovery request; presenting a device visualization based on discovery communication for displaying a target device discovered; determining a channel type of a backhaul channel based on the discovery communication; and establishing a backhaul communication based on the channel type for connecting a client device and the target device for the backhaul communication.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
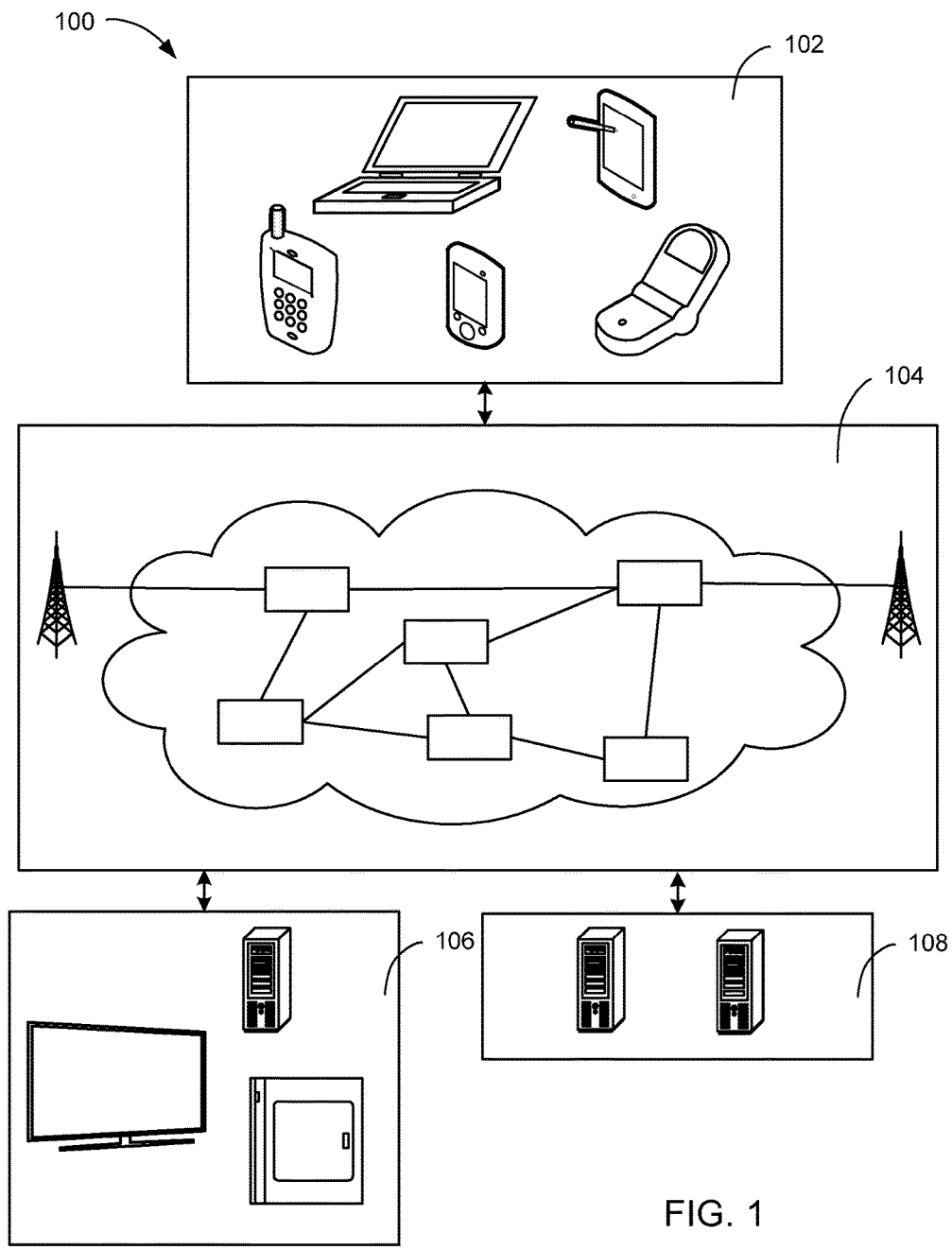
FIG. 1 is a computing system with control mechanism in an embodiment of the present invention.

The following embodiments of the present invention provide an agent device to control a device functionality of an electronic device remotely. The agent device can detect a server presence and the electronic device can detect a client presence to exchange communication pattern for the agent device to request the electronic device to execute an activity command to control the device functionality.

An embodiment of a present invention can determine a detection quantity based on a client recognition pattern received can improve the efficiency of assigning a channel bin. By limiting the assignment of the channel bin based on a channel occupancy, the embodiment of the present invention can assign the agent device to the channel bin with a channel availability. As a result, the embodiment of the present invention can generate the activity command based on an activity request pattern with the channel bin assigned for optimal allocation of a communication channel to control the device functionality of the electronic device.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "module" referred to herein can include software, hardware, or a combination thereof in the embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a computing system 100 with control mechanism in an embodiment of the present invention. The computing system 100 includes a first device 102, such as a client or a server, connected to a second device 106, such as a client or server. The first device 102 can communicate with the second device 106 with a communication path 104, such as a wireless or wired network. The computing system 100 can also include a third device 108 connected to the first device 102, the second device 106, or a combination thereof with the communication path 104. The third device 108 can be a client or server.

For example, the first device 102 or the third device 108 can be of any of a variety of display devices, such as a cellular phone, personal digital assistant, wearable digital device, tablet, notebook computer, television (TV), automotive telematic communication system, or other multi-functional mobile communication or entertainment device. The first device 102 or the third device 108 can be a standalone device, or can be incorporated with a vehicle, for example a car, truck, bus, aircraft, boat/vessel, or train. The first device 102 or the third device 108 can couple to the communication path 104 to communicate with the second device 106.

For illustrative purposes, the computing system 100 is described with the first device 102 or the third device 108 as a mobile device, although it is understood that the first device 102 or the third device 108 can be different types of devices. For example, the first device 102 or the third device 108 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof. For another example, the second device 106 can include appliances, such as washing machine or refrigerator, home entertainment system, such as TV, speakers, or video and audio equipment, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102 or the third device 108. The second device 106 can also be a client type device as described for the first device 102 or the third device 108.

In another example, the first device 102, the second device 106, or the third device 108 can be a particularized machine, such as a mainframe, a server, a cluster server, a rack mounted server, or a blade server, or as more specific examples, an IBM System z10™ Business Class mainframe or a HP ProLiant ML™ server. Yet another example, the first device 102, the second device 106, or the third device 108 can be a particularized machine, such as a portable computing device, a thin client, a notebook, a netbook, a smartphone, personal digital assistant, or a cellular phone, and as specific examples, an Apple iPhone™, Android™ smartphone, or Windows™ platform smartphone. For further example, the first device 102, the second device 106, or the third device 108 can represent a wearable device, a head-mounted device, or a combination thereof.

For illustrative purposes, the computing system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, aircraft, boat/vessel, or train.

Also for illustrative purposes, the computing system 100 is shown with the second device 106 and the first device 102 or the third device 108 as end points of the communication path 104, although it is understood that the computing system 100 can have a different partition between the first device 102, the second device 106, the third device 108, and the communication path 104. For example, the first device 102, the second device 106, the third device 108 or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, wireless High-Definition Multimedia Interface (HDMI), Near Field Communication (NFC), Infrared Data Association standard (IrDA), wireless fidelity (WiFi), and worldwide interoperability for microwave access (WiMAX) are examples of wireless communication that can be included in the communication path 104. Ethernet, HDMI, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
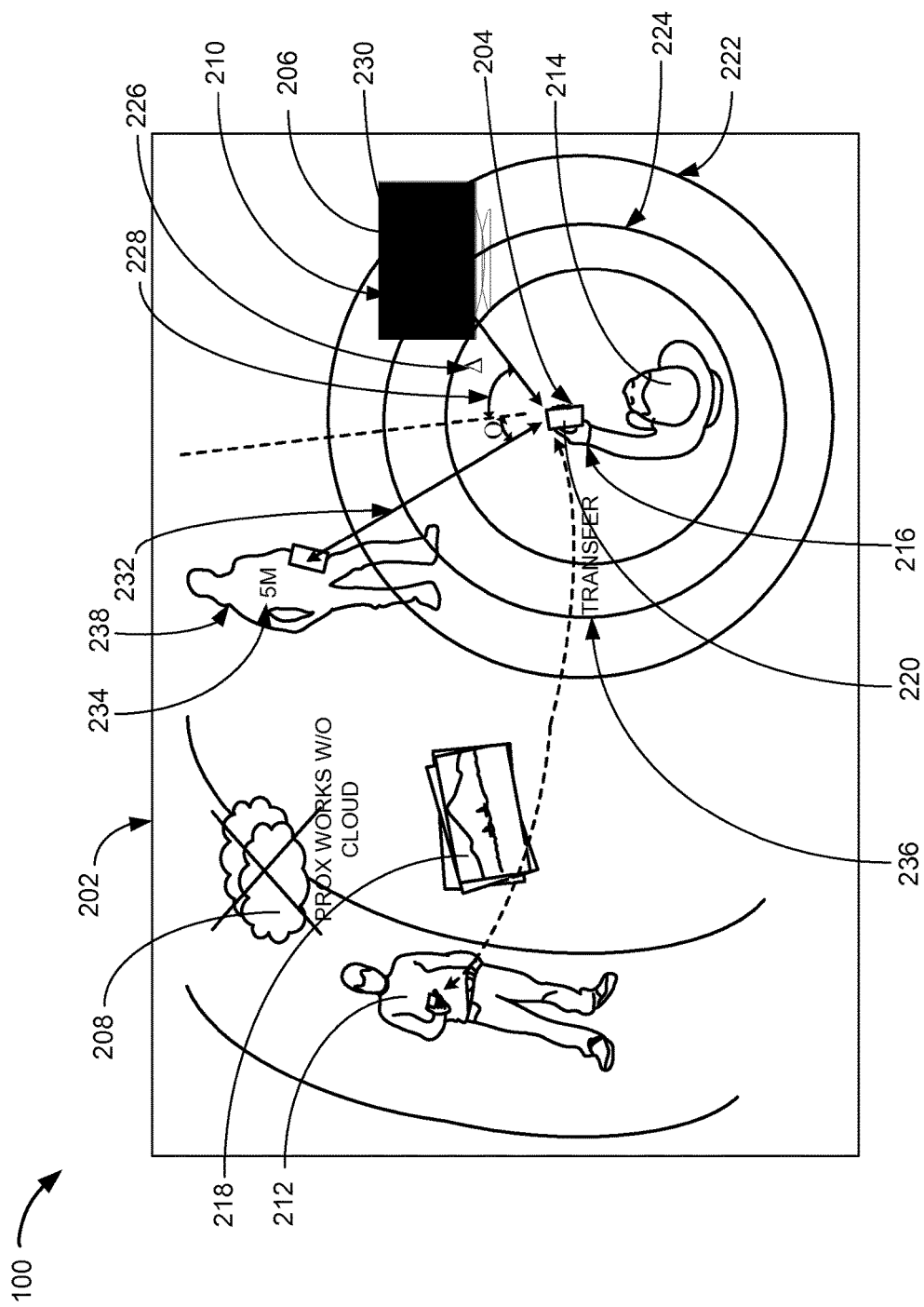
FIG. 2 is an example of a discovery context.

Referring now to FIG. 2, there is shown an example of a discovery context 202. For clarity and brevity, the discussion of an embodiment of the present invention will be described with a client device 204 as the first device 102 of FIG. 1, a target device 206 as the second device 106 of FIG. 1, and an external device 208 as the third device 108 of FIG. 1. However, the first device 102, the second device 106, and the third device 108 can be discussed interchangeably.

The discovery context 202 is a situation where a device is searching for another device to establish communication. For example, the discovery context 202 can represent the client device 204 representing a smartphone searching for the target device 206 representing a TV to establish communication.

The client device 204 is a device requesting connection with the target device 206. For example, the client device 204 can turn on or off the target device 206 representing a TV. For another example, the client device 204 can connect to the target device 206 representing a printer to print a document. For further example, the client device 204 can change the temperature by controlling the target device 206 representing a thermostat or an air conditioner.

The target device 206 is a device that provides the service. As discussed above, the target device 206 can respond to the request from the client device 204. A target device type 210 is a categorization of the target device 206. For example, the target device type 210 can include TV, radio, speaker, set-top box, appliance, or a combination thereof.

The external device 208 can represent the cloud computing resource. More specifically, the external device 208 can provide interface descriptors, applications, drivers, and other content, or information necessary for the client device 204 and the target device 206 to interact. For another example, the external device 208 can represent a communication conduit device. For a specific example, the external device 208 can represent a WiFi Access Point.

A client presence factor 212 can be captured by the client device 204. The client presence factor 212 is information related to the presence of the client device 204. For example, the client presence factor 212 can include a client device location 214, a gesture type 216, or a combination thereof. The client device location 214 is a physical location of the client device 204.

The gesture type 216 is a categorization of a user entry 218. For example, the gesture type 216 can represent holding the client device 204 to point towards the target device 206. For another example, the gesture type 216 can represent squeezing the sides of the client device 204, tapping on a display interface 220 of the client device 204, or a combination thereof. Further examples regarding the client presence factor 212 will be discussed below. The user entry 218 can include a manual entry, entry by performing the gesture type 216, an voice command, or a combination thereof.

A proximity boundary 222 is a perimeter surrounding a device. For example, the proximity boundary 222 can include a house, room, public venue, an office, vehicle, or a combination thereof surrounding the target device 206. A target device coordinate 224 is a location of the target device 206. The target device coordinate 224 can be described using a cardinal direction. For example, the target device coordinate 224 within the proximity boundary 222 can represent east end of a living room.

The target device coordinate 224 can include a coordinate type 226. The coordinate type 226 is a categorization of the target device coordinate 224. For example, the coordinate type 226 can include a relative device coordinate 228, an absolute device coordinate 230, or a combination thereof. The relative device coordinate 228 is a location of a device relative to a location of another device. For example, the relative device coordinate 228 can represent the target device 206 is on the west coordinate relative to the client device 204. The absolute device coordinate 230 is a set location of a device within an area. For example, the absolute device coordinate 230 can represent a set location of the target device 206 within the proximity boundary 222.

A device distance 232 is distance between one device to another device. For example, the device distance 232 between the client device 204 and the target device 206 can represent 5 meters. A distance threshold 234 is maximum distance between two devices. For example, the distance threshold 234 between the client device 204 and the target device 206 can represent 20 meters.

A user's intent 236 is a user's desired action. For example, the user's intent 236 can represent the user of the computing system 100 of FIG. 1 desiring to connect the client device 204 to the target device 206 representing TV and not the target device 206 representing camera. More specifically, the user's intent 236 can express the user's desire to connect to a particular instance of the target device 206 by pointing the client device 204 at the target device. The computing system 100 can prioritize the target device 206 pointed by the user.

An interaction group 238 is a collection of devices. For example, the interaction group 238 can be grouped based on a plurality of the client device 204 sharing same type of the user's intent 236. More specifically, the interaction group 238 can be formed amongst the instances of the client device 204 connected to the target device 206 to upload the pictures taken from the client device 204 to the target device 206.

Figure 3:
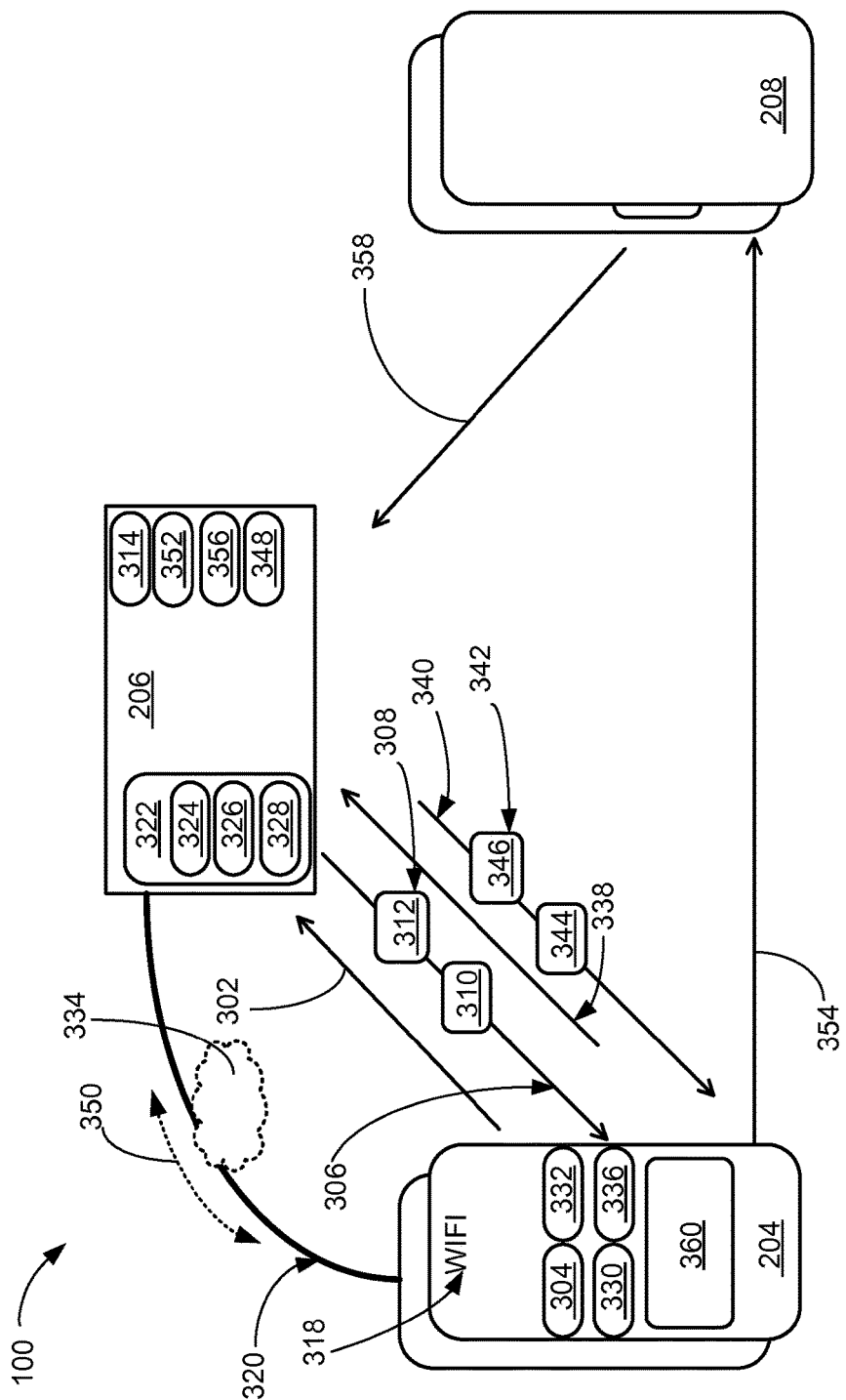
FIG. 3 is an example of an architectural diagram of the computing system.

Referring now to FIG. 3, there is shown an example of an architectural diagram of the computing system 100. For example, the client device 204 can communicate with the target device 206, the external device 208, or a combination thereof.

A discovery request 302 is a solicitation to discover a device. For example, the client device 204 can transmit the discovery request 302 to discover the target device 206 within the proximity boundary 222 of FIG. 2. A transmission time 304 can represent the time when the discovery request 302 is sent. Details regarding the discovery request 302 will be discussed below.

A discovery communication 306 is a response to the solicitation. For example, the target device 206 can respond to the discovery request 302 with the discovery communication 306. The discovery communication 306 can include a communication type 308, which is a categorization of the discovery communication 306. The communication type 308 can include a discovery response 310, a discovery packet 312, or a combination thereof.

The discovery response 310 is a response to the request initiated by another device. For example, the discovery response 310 can be a response to the discovery request 302. The discovery packet 312 is a communication initiated without a request from another device. For example, the target device 206 can broadcast the discovery packet 312 to the client device 204 without the discovery request 302.

The discovery communication 306 can include a device information 314, a device connectivity 316, or a combination thereof. The device information 314 is details regarding a device. For example, the device information 314 can include a device name, device identification (ID), manufacture ID, model ID, a channel type 318 supported, or a combination thereof of the target device 206. For further example, the device information 314 can include internet protocol address (IP Address), media access control address (MAC address), channel ID, or a combination thereof. The device connectivity 316 is a state whether the client device 204 and the target device 206 can connect or not.

The channel type 318 is a categorization of a communication protocol used between devices. The backhaul channel 320 is a communication protocol to exchange data between devices. For example, the communication path 104 of FIG. 1 can represent the backhaul channel 320. The backhaul channel 320 can include a high-bandwidth, such as WiFi, accessible via the internet (Session Traversal Utilities for Network Address Translation) or low power, such as Bluetooth, Enhanced Data Rate (EDR) and/or Bluetooth Low Energy (BLE). Furthermore, the backhaul channel 320 can include out-of-band radio frequency channel for higher speed data transfer. Additionally, the backhaul channel 320 can allow two-way bidirectional and omnidirectional connections.

The computing system 100 can determine the channel type 318 based on a transmission factor 322. The transmission factor 322 is a circumstance, criterion, or a combination thereof considered for determining the channel type 318. For example, the transmission factor 322 can include a transmission requirement 324, a transmission preference 326, a transmission condition 328, or a combination thereof.

The transmission requirement 324 is a prerequisite for communicating with the backhaul channel 320. For example, a device content 330 running on the client device 204 can have the transmission requirement 324 of using a particular instance of the channel type 318. For a different example, a device capability 332 of a device can limit the choice of using a particular instance of the channel type 318. Thus, the limitation of the device capability 332 can result in the transmission requirement 324 of using a particular instance of the channel type 318.

The device content 330 can include software application, interface descriptor, driver, multimedia content, or a combination thereof. The device capability 332 can include the ability and/or functionality of the client device 204, the target device 206, the external device 208, or a combination thereof.

The transmission condition 328 is a circumstance surrounding a device. For example, the transmission condition 328 can include a range, bandwidth, throughput, reliability, robustness, quality of service, or a combination thereof of the backhaul channel 320. The transmission condition 328 can include an environmental factor 334, a service cost 336, or a combination thereof.

The environmental factor 334 is a condition that reduces the quality of the backhaul channel 320. For example, the environmental factor 334 can include interference, noise, or a combination thereof. The service cost 336 is a burden placed on a device for communication. For example, the service cost 336 can include an estimated energy consumption by the client device 204 for communicating with the backhaul channel 320. For another example, the service cost 336 can include the time to complete a transaction between the client device 204 and the target device 206.

A connection request 338 is a solicitation to connect to a device with a particular instance of the channel type 318. For example, once the client device 204 selected the channel type 318 representing WiFi, the client device 204 can communicate the connection request 338 to the target device 206 to establish a communication using the backhaul channel 320 representing WiFi.

A connection response 340 is a response to the solicitation to connect with a particular instance of the channel type 318. For example, the connection response 340 can include a response type 342, which is a categorization of the connection response 340. More specifically, the response type 342 can include a connection confirmation 344, a connection directive 346, or a combination thereof.

The connection confirmation 344 is an acceptance by a device to connect with a particular instance of the channel type 318. For example, the target device 206 can communicate the connection confirmation 344 to connect with the channel type 318 selected by the client device 204. The connection directive 346 is a command by a device to connect with a particular instance of the channel type 318. For example, the target device 206 can communicate the connection directive 346 to command the client device 204 to connect with a particular instance of the channel type 318 selected by the target device 206.

The connection response 340 can include a channel connectibility 348. The channel connectibility 348 is a result whether two devices can connect with a particular instance of the channel type 318. For example, the client device 204 and the target device 206 can connect with the channel type 318 of WiFi if the channel connectibility 348 is "yes." In contrast, the client device 204 and the target device 206 will not be able to with the channel type 318 of WiFi if the channel connectibility 348 is "no."

If the client device 204 receives the connection confirmation 344, the client device 204 can establish a backhaul communication 350 with the target device 206 with a particular instance of the channel type 318. The backhaul communication 350 is a state where a communication with the backhaul channel 320 is established between devices.

The computing system 100 can pause the backhaul communication 350, change the channel type 318, or a combination thereof if the transmission condition 328 fails to meet or exceed a condition threshold 352. The condition threshold 352 is a minimum requirement for the transmission condition 328 to maintain the backhaul communication 350. For example, if the transmission condition 328 representing the range, bandwidth, throughput, reliability, robustness, quality of service, or a combination thereof dips below the condition threshold 352 also representing the range, bandwidth, throughput, reliability, robustness, quality of service, or a combination thereof, the computing system 100 can pause the backhaul communication 350.

An information request 354 is a solicitation to request data from a device. For example, the client device 204 can communicate the information request 354 to the target device 206 once the backhaul communication 350 is established. For further example, the client device 204 can communicate the information request 354 to request a meta-information 356 from the target device 206.

The meta-information 356 can represent data informing a device of an activity to perform, configuration data of a device, the device content 330, or a combination thereof. For example, the meta-information 356 can include a version of the device content 330, such as software application and/or driver, required to interact with the target device 206. For another example, the meta-information 356 can include a pointer to direct the client device 204 to communicate with the external device 208 rather than the target device 206 to download an installation content 358.

The installation content 358 is the setup data requested by a device. For example, the installation content 358 can include a patch, driver, software application, library, or a combination thereof. A content sufficiency 360 is an adequacy of the installation content 358. For example, the content sufficiency 360 can represent the latest version or minimum version of a driver required for the client device 204 to interact with the target device 206. More specifically, if the content sufficiency 360 is "no" for obtaining the installation content 358 from the target device 206, the client device 204 can download further instance of the installation content 358 from the external device 208.

Figure 4:
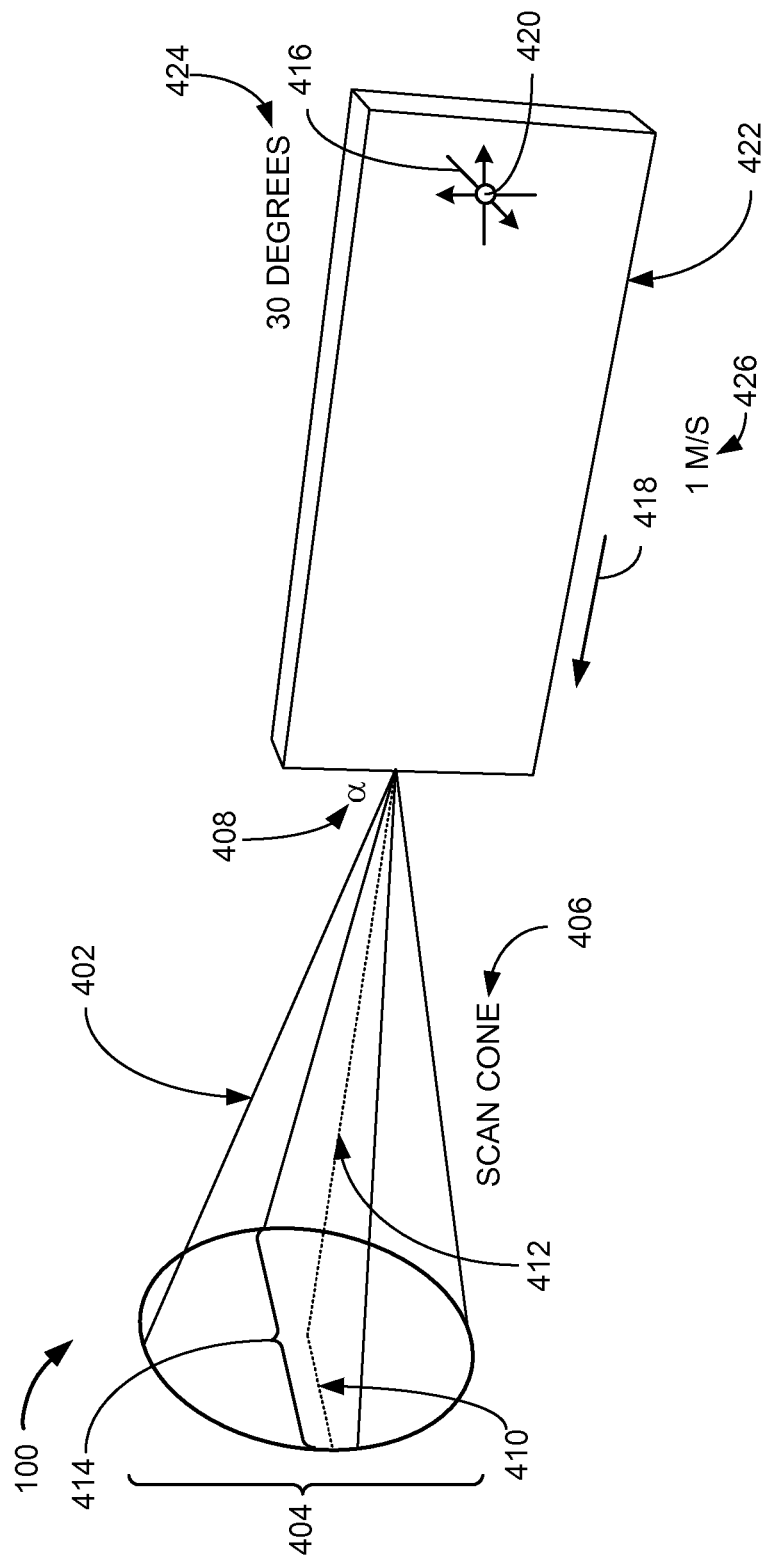
FIG. 4 is examples of transmitting the discovery request of FIG. 3 including the client presence factor.

Referring now to FIG. 4, there is shown an example of transmitting the discovery request 302 of FIG. 3 including the client presence factor 212 of FIG. 2. The discovery request 302 can be transmitted in a format of a scan pattern 402. The scan pattern 402 is a transmission characteristic. For example, the scan pattern 402 can represent a mechanical wave, an electromagnetic wave, or a combination thereof. For a specific example, the scan pattern 402 of the discovery request 302 can be transmitted as infrared at 100 kilobits per second.

The scan pattern 402 can include a scan dimension 404, which is a property of space of the scan pattern 402. For example, the scan dimension 404 can include a pattern shape 406, a pattern angle 408, a pattern radius 410, a pattern height 412, or a combination thereof.

The pattern shape 406 can include a cone shape, a beam, or a combination thereof. The pattern angle 408 can represent a degree in angle the scan pattern 402 is emitted from the client device 204 of FIG. 2. More specifically, the pattern shape 406 representing a cone can have the pattern angle 408 of 20 degrees at the vertex of the cone.

The pattern shape 406 can have the pattern radius 410, the pattern height 412, or a combination thereof to form the cone shape. More specifically, the pattern radius 410, the pattern height 412, or a combination thereof can be adjusted to change the scan dimension 404 of the scan pattern 402. For example, the pattern height 412 can represent 5 meters. A scan range 414 is a scope of the scan pattern 402. For example, the scan range 414 can include the pattern shape 406, the pattern radius 410, the pattern height 412 to determine how wide or narrow the scan pattern 402 is to discover the target device 206 of FIG. 2.

A transmission power 428 is amount of energy consumed per unit time for transmitting information from one device to another device. For example, the client device 204 can increase the transmission power 428 for transmitting the discovery request 302.

The client presence factor 212 can include a device orientation 416, a device movement 418, or a combination thereof. The device orientation 416 is a posture of a device. For example, the device orientation 416 can be measured with a detecting sensor 420 based on a heading, pitch, roll, yaw, or a combination thereof of the client device 204. The detecting sensor 420 can represent accelerometer, magnetometer, gyroscope, compass, spectrum analyzer, beacon, or the combination thereof.

The device movement 418 is a motion of a device. For example, the device movement 418 of the client device 204 can result from a change in the device orientation 416 of the client device 204. More specifically, the device movement 418 can represent a device side 422 of the client device 204 turning from perpendicular to the ground to parallel to the ground. For another example, the device movement 418 can result from the user of the computing system 100 carrying the client device 204 from one location to another location.

An orientation threshold 424 is a limit in change of the device orientation 416. For example, the orientation threshold 424 can represent a change in yaw of 30 degrees per second. For a different example, the orientation threshold 424 can allow a difference of 8 degrees of freedom or buffer before the device orientation 416 is considered to have exceeded the orientation threshold 424. A movement threshold 426 is a limit in change of the device movement 418. For example, the movement threshold 426 can represent the client device 204 in motion at 1 meter per second.

Figure 5:
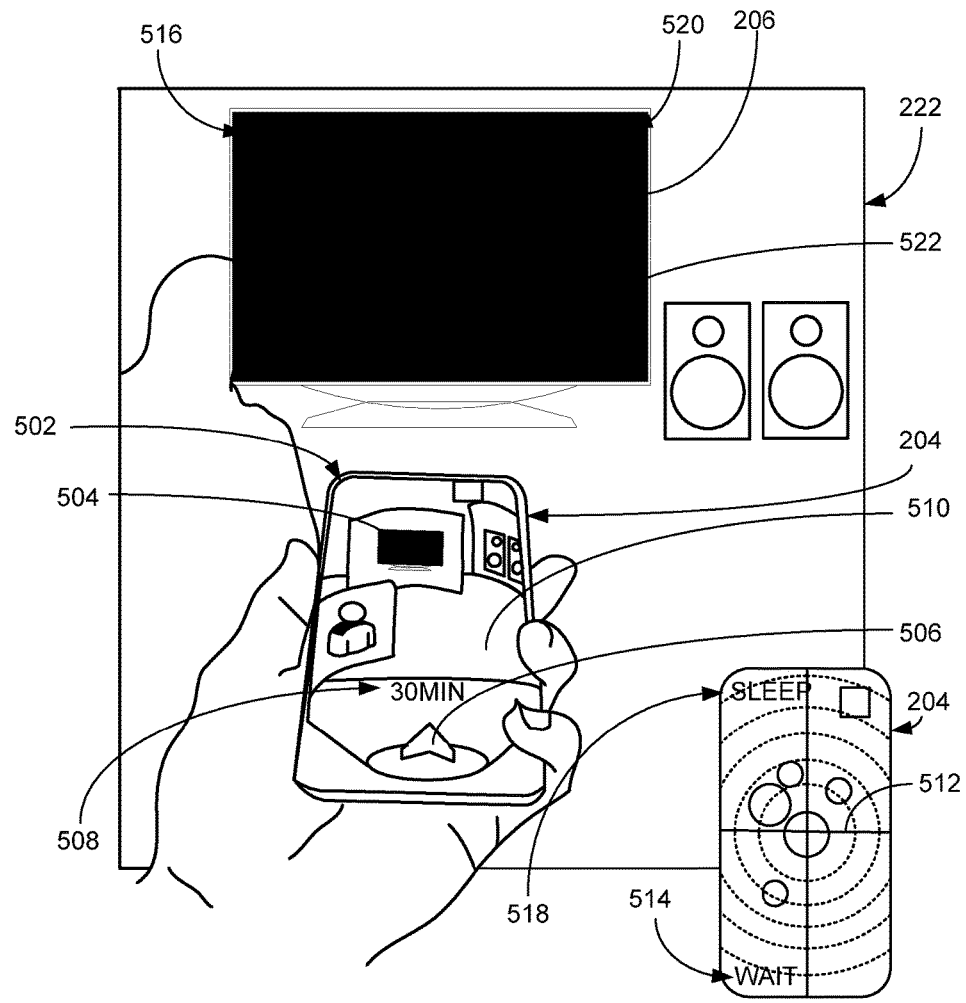
FIG. 5 is an example of a device visualization.

Referring now to FIG. 5, there is shown an example of a device visualization 502. The device visualization 502 is an image of a physical area. For example, the device visualization 502 can include a device image 504 of the client device 204, the target device 206, or a combination thereof displayed on the display interface 220 of the client device 204. The device image 504 is a digital depiction. For example, the device image 504 can represent the digital depiction of the client device 204, the target device 206, the proximity boundary 222, or a combination thereof.

The device visualization 502 can include a micro view 510, a macro view 512, or a combination thereof. The micro view 510 is a ground level depiction of the physical area. The macro view 512 is a Birdseye view depiction of the physical area. For example, the micro view 510, the macro view 512, or a combination thereof can include the device image 504 of the client device 204, the target device 206, or a combination thereof displayed on the display interface 220 of the client device 204.

A pre-cached content 506 is a prepared information for improving access of a device. For example, the pre-cached content 506 can include a user interface, a software application, or a combination thereof. More specifically, the pre-cached content 506 can eliminate start-up latency for the user when the client device 204 is used to trigger an action to connect and interact with the nearby instance of the target device 206. For a different example, the pre-cached content 506 can represent a stored version of the installation content 358 of FIG. 3.

A time threshold 508 is a time limit on the pre-cached content 506. For example, if the time threshold 508 is 30 minutes, after 30 minutes has elapsed without any interactions between the client device 204 and the target device 206, the pre-cached content 506 can be decayed or removed to free up resource of the client device 204.

A mode type 514 is a categorization of a device state. For example, the mode type 514 can include an awake mode 516, a sleep mode 518, or a combination thereof. The awake mode 516 is a device state where the device has discovered another device. The sleep mode 518 is a device state where the device has not discovered another device.

A notification 520 is information informing the existence of a device. For example, the notification 520 can represent a discovery of the target device 206 presented on the display interface 220 of FIG. 2 of the client device 204. A trust level 522 is a degree in which a device can permit another device to expose the information about the device. For example, the trust level 522 can represent "trusted" or "not trusted." More specifically, if the target device 206 has the trust level 522 of "trusted," the client device 204 can permit the target device 206 to display the device information 314 of FIG. 3 of the client device 204.

Figure 6:
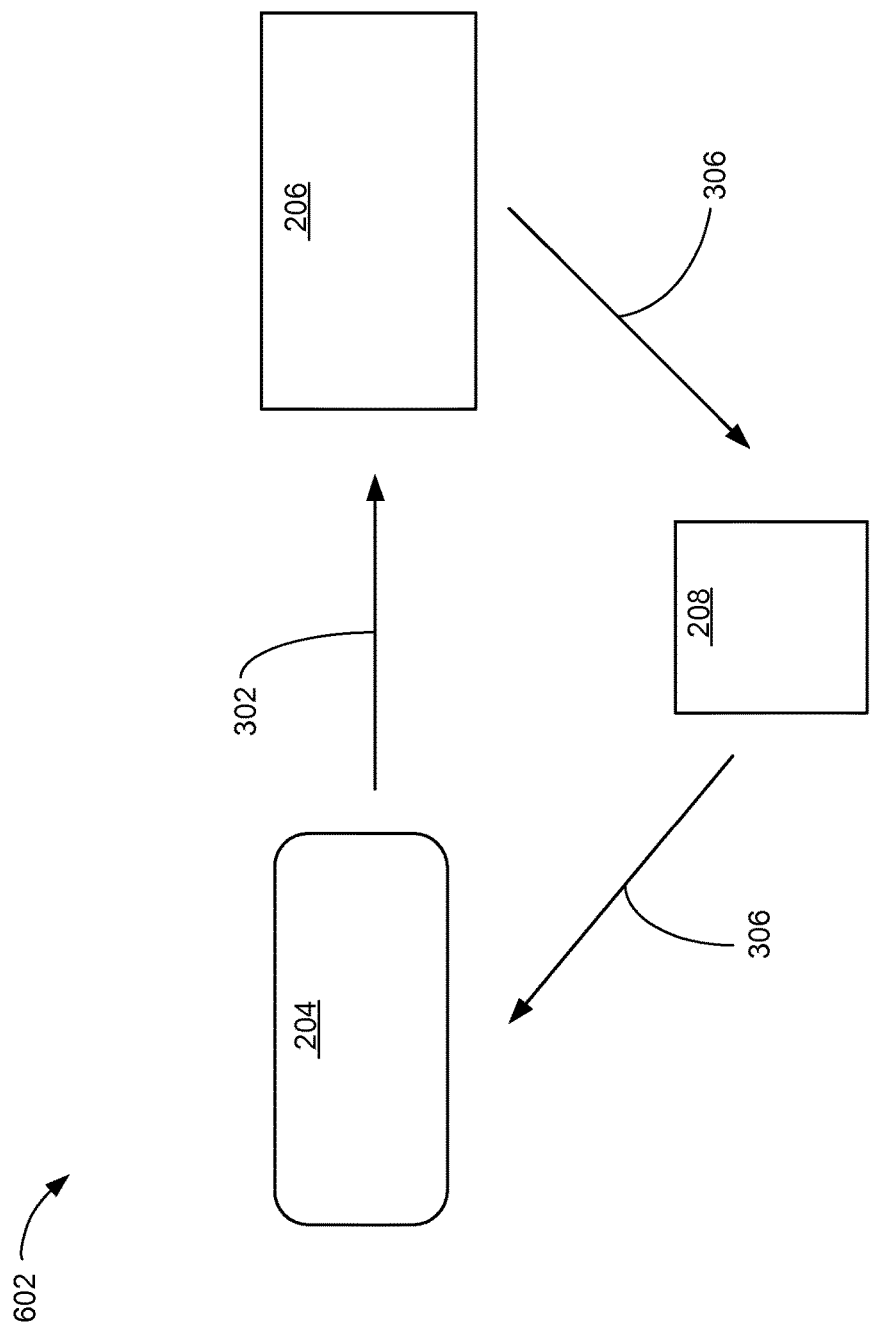
FIG. 6 is an example of an architectural diagram for a reverse discovery.

Referring now to FIG. 6, there is shown an example of an architectural diagram for a reverse discovery 602. The reverse discovery 602 can allow the target device 206 to respond to the client device 204 with the channel type 318 of FIG. 3 different from the channel type 318 used by the client device 204. For example, the client device 204 can have an infrared emitter but is not equipped with infrared receiver. More specifically, the client device 204 can transmit the discovery request 302 with the scan pattern 402 of FIG. 4 of infrared. However, the client device 204 may not be able to receive the discovery communication 306 transmitted as infrared.

As discussed above, the client device 204 can transmit the discovery request 302 with the scan pattern 402 of infrared. If the client device 204 does not have an infrared receiver, the target device can respond the discovery communication 306 with the channel type 318 of radio frequency, Bluetooth interface, or a combination thereof.

For further example, the target device 206 can respond to the client device 204 by transmitting the discovery communication 306 via the external device 208 representing a communication conduit device. More specifically, the target device 206 can transmit the discovery communication 306 to the external device 208. And the external device 208 can transmit the discovery communication 306 to the client device 204.

Figure 7:
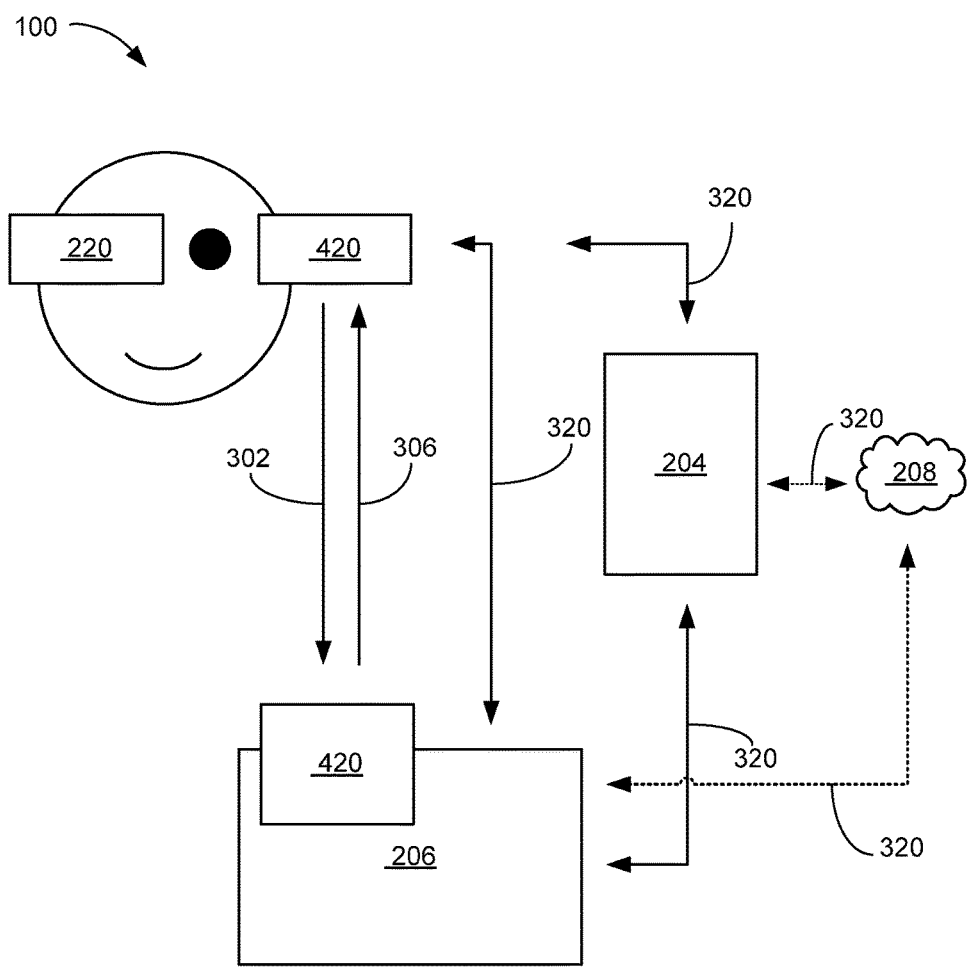
FIG. 7 is an example of establishing the backhaul communication of FIG. 3 between the client device representing a head-mounted device and the target device.

Referring now to FIG. 7, there is shown an example of establishing the backhaul communication 350 of FIG. 3 between the client device 204 representing a head-mounted device and the target device 206. For example, the client device 102 can include the display interface 220 representing the heads up display, the detecting sensor 420 representing the beacon, or a combination thereof.

As discussed above, the detecting sensor 420 representing the beacon of the client device 204 and the detecting sensor 420 representing the beacon of the target device 206 can exchange the discovery request 302 and the discovery confirmation 306. Once the backhaul communication 350 is established, the client device 204 and the target device 206 can transmit data in various ways.

For example, the client device 204 can communicate directly with the target device 206 through the backhaul channel 320. For another example, the client device 204 can communicate indirectly with the target device 206 through the external device 208 representing a cloud computing service.

Figure 8:
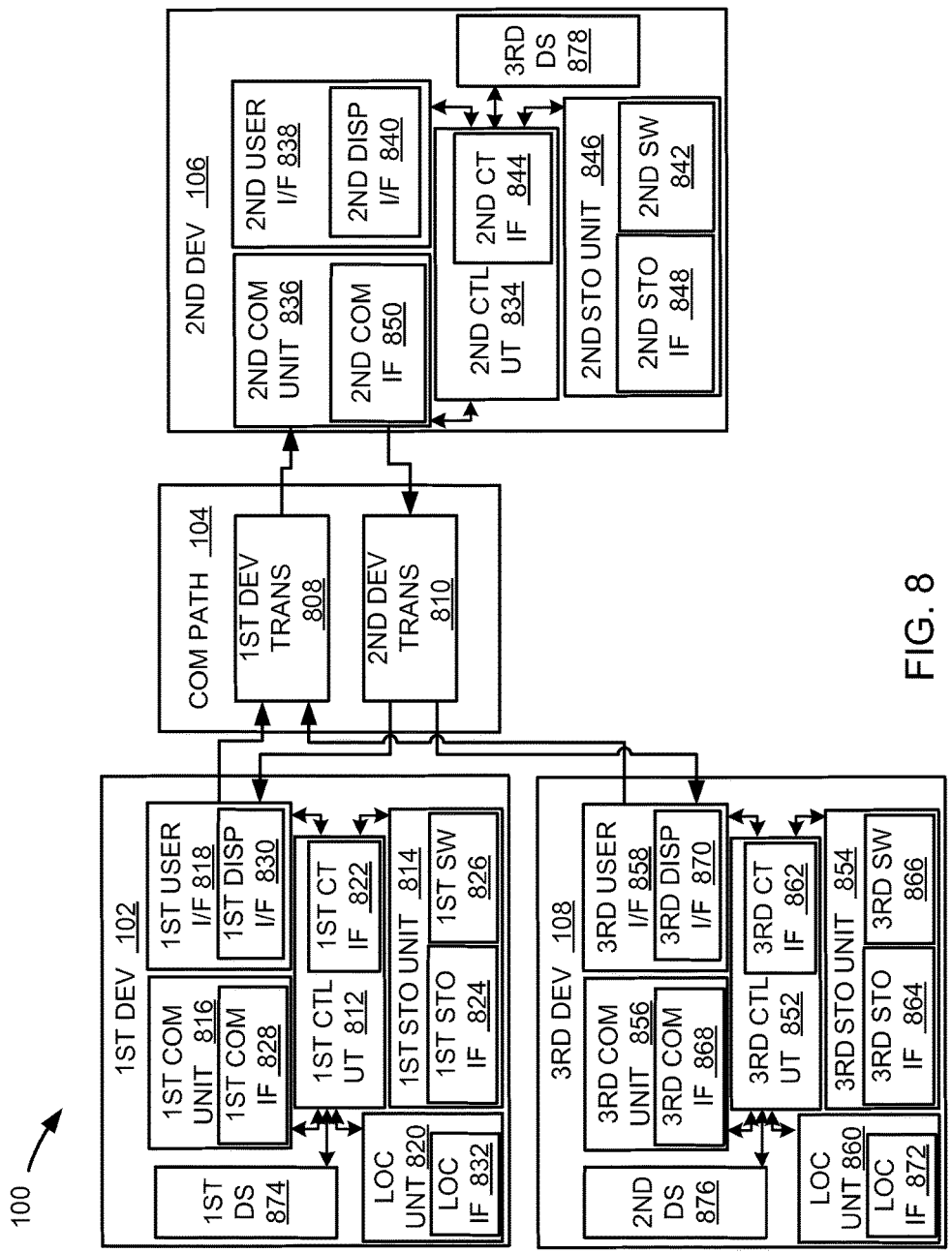
FIG. 8 is an exemplary block diagram of the computing system.

Referring now to FIG. 8, therein is shown an exemplary block diagram of the computing system 100. The computing system 100 can include the first device 102, the third device 108, the communication path 104, and the second device 106. The first device 102 or the third device 108 can send information in a first device transmission 808 over the communication path 104 to the second device 106. The second device 106 can send information in a second device transmission 810 over the communication path 104 to the first device 102 or the third device 108.

For illustrative purposes, the computing system 100 is shown with the first device 102 as the client device 204 of FIG. 2, although it is understood that the computing system 100 can have the first device 102 as a different type of device. For example, the first device 102 can be the target device 206 of FIG. 2.

Also for illustrative purposes, the computing system 100 is shown with the second device 106 as a server, although it is understood that the computing system 100 can have the second device 106 as a different type of device. For example, the second device 106 can be the client device 204.

For brevity of description in this embodiment of the present invention, the first device 102 will be described as the client device 204, the second device 106 will be described as the target device 206, and the third device 108 will be described as the external device 208 of FIG. 2. The embodiment of the present invention is not limited to this selection for the type of devices. The selection is an example of the present invention.

The first device 102 can include a first control unit 812, a first storage unit 814, a first communication unit 816, a first user interface 818, and a location unit 820. The first control unit 812 can include a first control interface 822. The first control unit 812 can execute a first software 826 to provide the intelligence of the computing system 100.

The first control unit 812 can be implemented in a number of different manners. For example, the first control unit 812 can be a processor, an application specific integrated circuit (ASIC) an embedded processor, a microprocessor, a hardware control logic, a hardware finite state machine (FSM), a digital signal processor (DSP), or a combination thereof.

The first control interface 822 can be used for communication between the first control unit 812 and other functional units in the first device 102. The first control interface 822 can also be used for communication that is external to the first device 102.

The first control interface 822 can receive information from the other functional units or from external sources, or can transmit information to the other functional units or to external destinations. The external sources and the external destinations refer to sources and destinations physically separate from to the first device 102.

The first control interface 822 can be implemented in different ways and can include different implementations depending on which functional units or external units are being interfaced with the first control interface 822. For example, the first control interface 822 can be implemented with a pressure sensor, an inertial sensor, a microelectromechanical system (MEMS), optical circuitry, waveguides, wireless circuitry, wireline circuitry, or a combination thereof.

The location unit 820 can generate location information, current heading, and current speed of the first device 102, as examples. The location unit 820 can be implemented in many ways. For example, the location unit 820 can function as at least a part of a global positioning system (GPS), an inertial navigation system, a cellular-tower location system, a pressure location system, or any combination thereof.

The location unit 820 can include a location interface 832. The location interface 832 can be used for communication between the location unit 820 and other functional units in the first device 102. The location interface 832 can also be used for communication that is external to the first device 102.

The location interface 832 can receive information from the other functional units or from external sources, or can transmit information to the other functional units or to external destinations. The external sources and the external destinations refer to sources and destinations physically separate from the first device 102.

The location interface 832 can include different implementations depending on which functional units or external units are being interfaced with the location unit 820. The location interface 832 can be implemented with technologies and techniques similar to the implementation of the first control interface 822.

The first storage unit 814 can store the first software 826. The first storage unit 814 can also store the relevant information, such as advertisements, points of interest (POI), navigation routing entries, or any combination thereof. The relevant information can also include news, media, events, or a combination thereof from the third party content provider. The first storage unit 814 can further store the installation content 358 of FIG. 3, the pre-cached content 506 of FIG. 5, or a combination thereof.

The first storage unit 814 can be a volatile memory, a nonvolatile memory, an internal memory, an external memory, or a combination thereof. For example, the first storage unit 814 can be a nonvolatile storage such as non-volatile random access memory (NVRAM), Flash memory, disk storage, or a volatile storage such as static random access memory (SRAM).

The first storage unit 814 can include a first storage interface 824. The first storage interface 824 can be used for communication between and other functional units in the first device 102. The first storage interface 824 can also be used for communication that is external to the first device 102.

The first storage interface 824 can receive information from the other functional units or from external sources, or can transmit information to the other functional units or to external destinations. The external sources and the external destinations refer to sources and destinations physically separate from the first device 102.

The first storage interface 824 can include different implementations depending on which functional units or external units are being interfaced with the first storage unit 814. The first storage interface 824 can be implemented with technologies and techniques similar to the implementation of the first control interface 822.

The first communication unit 816 can enable external communication to and from the first device 102. For example, the first communication unit 816 can permit the first device 102 to communicate with the first device 102 of FIG. 1, an attachment, such as a peripheral device or a computer desktop, and the communication path 104.

The first communication unit 816 can also function as a communication hub allowing the first device 102 to function as part of the communication path 104 and not limited to be an end point or terminal unit to the communication path 104. The first communication unit 816 can include active and passive components, such as microelectronics or an antenna, for interaction with the communication path 104.

The first communication unit 816 can include a first communication interface 828. The first communication interface 828 can be used for communication between the first communication unit 816 and other functional units in the first device 102. The first communication interface 828 can receive information from the other functional units or can transmit information to the other functional units.

The first communication interface 828 can include different implementations depending on which functional units are being interfaced with the first communication unit 816. The first communication interface 828 can be implemented with technologies and techniques similar to the implementation of the first control interface 822.

The first user interface 818 allows a user (not shown) to interface and interact with the first device 102. The first user interface 818 can include an input device and an output device. Examples of the input device of the first user interface 818 can include a keypad, a touchpad, soft-keys, a keyboard, a microphone, an infrared sensor for receiving remote signals, or any combination thereof to provide data and communication inputs.

The first user interface 818 can include a first display interface 830. The first display interface 830 can include a display, a projector, a video screen, a speaker, or any combination thereof.

The first control unit 812 can operate the first user interface 818 to display information generated by the computing system 100. The first control unit 812 can also execute the first software 826 for the other functions of the computing system 100, including receiving location information from the location unit 820. The first control unit 812 can further execute the first software 826 for interaction with the communication path 104 via the first communication unit 816.

The second device 106 can be optimized for implementing the embodiment of the present invention in a multiple device embodiment with the second device 106. The second device 106 can provide the additional or higher performance processing power compared to the first device 102. The second device 106 can include a second control unit 834, a second communication unit 836, and a second user interface 838.

The second user interface 838 allows a user (not shown) to interface and interact with the second device 106. The second user interface 838 can include an input device and an output device. Examples of the input device of the second user interface 838 can include a keypad, a touchpad, softkeys, a keyboard, a microphone, or any combination thereof to provide data and communication inputs. Examples of the output device of the second user interface 838 can include a second display interface 840. The second display interface 840 can include a display, a projector, a video screen, a speaker, or any combination thereof.

The second control unit 834 can execute a second software 842 to provide the intelligence of the second device 106 of the computing system 100. The second software 842 can operate in conjunction with the first software 826. The second control unit 834 can provide additional performance compared to the first control unit 812.

The second control unit 834 can operate the second user interface 838 to display information. The second control unit 834 can also execute the second software 842 for the other functions of the computing system 100, including operating the second communication unit 836 to communicate with the second device 106 over the communication path 104.

The second control unit 834 can be implemented in a number of different manners. For example, the second control unit 834 can be a processor, an embedded processor, a microprocessor, hardware control logic, a hardware finite state machine (FSM), a digital signal processor (DSP), or a combination thereof.

The second control unit 834 can include a second control interface 844. The second control interface 844 can be used for communication between the second control unit 834 and other functional units in the second device 106. The second control interface 844 can also be used for communication that is external to the second device 106.

The second control interface 844 can receive information from the other functional units or from external sources, or can transmit information to the other functional units or to external destinations. The external sources and the external destinations refer to sources and destinations physically separate from the second device 106.

The second control interface 844 can be implemented in different ways and can include different implementations depending on which functional units or external units are being interfaced with the second control interface 844. For example, the second control interface 844 can be implemented with a pressure sensor, an inertial sensor, a microelectromechanical system (MEMS), optical circuitry, waveguides, wireless circuitry, wireline circuitry, or a combination thereof.

A second storage unit 846 can store the second software 842. The second storage unit 846 can also store the relevant information, such as advertisements, points of interest (POI), navigation routing entries, or any combination thereof. The second storage unit 846 can be sized to provide the additional storage capacity to supplement the first storage unit 814.

For illustrative purposes, the second storage unit 846 is shown as a single element, although it is understood that the second storage unit 846 can be a distribution of storage elements. Also for illustrative purposes, the computing system 100 is shown with the second storage unit 846 as a single hierarchy storage system, although it is understood that the computing system 100 can have the second storage unit 846 in a different configuration. For example, the second storage unit 846 can be formed with different storage technologies forming a memory hierarchal system including different levels of caching, main memory, rotating media, or off-line storage. The second storage unit 846 can also store the installation content 358, the pre-cached content 506, or a combination thereof.

The second storage unit 846 can be a volatile memory, a nonvolatile memory, an internal memory, an external memory, or a combination thereof. For example, the second storage unit 846 can be a nonvolatile storage such as non-volatile random access memory (NVRAM), Flash memory, disk storage, or a volatile storage such as static random access memory (SRAM).

The second storage unit 846 can include a second storage interface 848. The second storage interface 848 can be used for communication between other functional units in the second device 106. The second storage interface 848 can also be used for communication that is external to the second device 106.

The second storage interface 848 can receive information from the other functional units or from external sources, or can transmit information to the other functional units or to external destinations. The external sources and the external destinations refer to sources and destinations physically separate from the second device 106.

The second storage interface 848 can include different implementations depending on which functional units or external units are being interfaced with the second storage unit 846. The second storage interface 848 can be implemented with technologies and techniques similar to the implementation of the second control interface 844.

The second communication unit 836 can enable external communication to and from the second device 106. For example, the second communication unit 836 can permit the second device 106 to communicate with the first device 102 over the communication path 104.

The second communication unit 836 can also function as a communication hub allowing the second device 106 to function as part of the communication path 104 and not limited to be an end point or terminal unit to the communication path 104. The second communication unit 836 can include active and passive components, such as microelectronics or an antenna, for interaction with the communication path 104.

The second communication unit 836 can include a second communication interface 850. The second communication interface 850 can be used for communication between the second communication unit 836 and other functional units in the second device 106. The second communication interface 850 can receive information from the other functional units or can transmit information to the other functional units.

The second communication interface 850 can include different implementations depending on which functional units are being interfaced with the second communication unit 836. The second communication interface 850 can be implemented with technologies and techniques similar to the implementation of the second control interface 844.

The first communication unit 816 can couple with the communication path 104 to send information to the second device 106 in the first device transmission 808. The second device 106 can receive information in the second communication unit 836 from the first device transmission 808 of the communication path 104.

The second communication unit 836 can couple with the communication path 104 to send information to the first device 102 in the second device transmission 810. The first device 102 can receive information in the first communication unit 816 from the second device transmission 810 of the communication path 104. The computing system 100 can be executed by the first control unit 812, the second control unit 834, or a combination thereof.

For illustrative purposes, the second device 106 is shown with the partition having the second user interface 838, the second storage unit 846, the second control unit 834, and the second communication unit 836, although it is understood that the second device 106 can have a different partition. For example, the second software 842 can be partitioned differently such that some or all of its function can be in the second control unit 834 and the second communication unit 836. Also, the second device 106 can include other functional units not shown in FIG. 8 for clarity.

The third device 108 can include a third control unit 852, a third storage unit 854, a third communication unit 856, a third user interface 858, and a location unit 860. The third control unit 852 can include a third control interface 862. The third control unit 852 can execute a third software 866 to provide the intelligence of the computing system 100. The third control unit 852 can be implemented in a number of different manners. For example, the third control unit 852 can be a processor, an embedded processor, a microprocessor, a hardware control logic, a hardware finite state machine (FSM), a digital signal processor (DSP), or a combination thereof. The third control interface 862 can be used for communication between the third control unit 852 and other functional units in the third device 108. The third control interface 862 can also be used for communication that is external to the third device 108.

The third control interface 862 can receive information from the other functional units or from external sources, or can transmit information to the other functional units or to external destinations. The external sources and the external destinations refer to sources and destinations physically separate to the third device 108.

The third control interface 862 can be implemented in different ways and can include different implementations depending on which functional units or external units are being interfaced with the third control interface 862. For example, the third control interface 862 can be implemented with a pressure sensor, an inertial sensor, a microelectromechanical system (MEMS), optical circuitry, waveguides, wireless circuitry, wireline circuitry, or a combination thereof.

The location unit 860 can generate location information, current heading, and current speed of the third device 108, as examples. The location unit 860 can be implemented in many ways. For example, the location unit 860 can function as at least a part of a global positioning system (GPS), an inertial navigation system, a cellular-tower location system, a pressure location system, or any combination thereof.

The location unit 860 can include a location interface 872. The location interface 872 can be used for communication between the location unit 860 and other functional units in the third device 108. The location interface 872 can also be used for communication that is external to the third device 108.

The location interface 872 can receive information from the other functional units or from external sources, or can transmit information to the other functional units or to external destinations. The external sources and the external destinations refer to sources and destinations physically separate to the third device 108.

The location interface 872 can include different implementations depending on which functional units or external units are being interfaced with the location unit 860. The location interface 872 can be implemented with technologies and techniques similar to the implementation of the third control interface 862.

The third storage unit 854 can store the third software 866. The third storage unit 854 can also store the relevant information, such as advertisements, points of interest (POI), navigation routing entries, or any combination thereof. The third storage unit 854 can further store the installation content 358, the pre-cached content 506, or a combination thereof.

The third storage unit 854 can be a volatile memory, a nonvolatile memory, an internal memory, an external memory, or a combination thereof. For example, the third storage unit 854 can be a nonvolatile storage such as non-volatile random access memory (NVRAM), Flash memory, disk storage, or a volatile storage such as static random access memory (SRAM).

The third storage unit 854 can include a third storage interface 864. The third storage interface 864 can be used for communication between the location unit 860 and other functional units in the third device 108. The third storage interface 864 can also be used for communication that is external to the third device 108.

The third storage interface 864 can receive information from the other functional units or from external sources, or can transmit information to the other functional units or to external destinations. The external sources and the external destinations refer to sources and destinations physically separate to the third device 108.

The third storage interface 864 can include different implementations depending on which functional units or external units are being interfaced with the third storage unit 854. The third storage interface 864 can be implemented with technologies and techniques similar to the implementation of the third control interface 862.

The third communication unit 856 can enable external communication to and from the third device 108. For example, the third communication unit 856 can permit the third device 108 to communicate with the second device 106 of FIG. 1, an attachment, such as a peripheral device or a computer desktop, and the communication path 104.

The third communication unit 856 can also function as a communication hub allowing the third device 108 to function as part of the communication path 104 and not limited to be an end point or terminal unit to the communication path 104. The third communication unit 856 can include active and passive components, such as microelectronics or an antenna, for interaction with the communication path 104.

The third communication unit 856 can include a third communication interface 868. The third communication interface 868 can be used for communication between the third communication unit 856 and other functional units in the third device 108. The third communication interface 868 can receive information from the other functional units or can transmit information to the other functional units.

The third communication interface 868 can include different implementations depending on which functional units are being interfaced with the third communication unit 856. The third communication interface 868 can be implemented with technologies and techniques similar to the implementation of the third control interface 862.

The third user interface 858 allows a user (not shown) to interface and interact with the third device 108. The third user interface 858 can include an input device and an output device. Examples of the input device of the third user interface 858 can include a keypad, a touchpad, soft-keys, a keyboard, a microphone, or any combination thereof to provide data and communication inputs.

The third user interface 858 can include a third display interface 870. The third display interface 870 can include a display, a projector, a video screen, a speaker, or any combination thereof.

The third control unit 852 can operate the third user interface 858 to display information generated by the computing system 100. The third control unit 852 can also execute the third software 866 for the other functions of the computing system 100, including receiving location information from the location unit 860. The third control unit 852 can further execute the third software 866 for interaction with the communication path 104 via the third communication unit 856.

The functional units in the first device 102 can work individually and independently of the other functional units. The first device 102 can work individually and independently from the second device 106, the third device 108, and the communication path 104.

The functional units in the second device 106 can work individually and independently of the other functional units. The second device 106 can work individually and independently from the first device 102, the third device 108, and the communication path 104.

The functional units in the third device 108 can work individually and independently of the other functional units. The third device 108 can work individually and independently from the first device 102, the second device 106, and the communication path 104.

For illustrative purposes, the computing system 100 is described by operation of the first device 102, the second device 106, and the third device 108. It is understood that the first device 102, the second device 106, the third device 108 can operate any of the modules and functions of the computing system 100. For example, the first device 102 is described to operate the location unit 820, although it is understood that the second device 106 or the third device 108 can also operate the location unit 820.

A first detecting sensor 874 can be the detecting sensor 420 of FIG. 4. Examples of the first detecting sensor 874 can include accelerometer, magnetometer, gyroscope, compass, spectrum analyzer, beacon, or the combination thereof.

A second detecting sensor 876 can be the detecting sensor 420. Examples of the second detecting sensor 876 can include accelerometer, magnetometer, gyroscope, compass, spectrum analyzer, beacon, or the combination thereof.

A third detecting sensor 878 can be the detecting sensor 420. Examples of the third detecting sensor 878 can include accelerometer, magnetometer, gyroscope, compass, spectrum analyzer, beacon, or the combination thereof.

Figure 9:
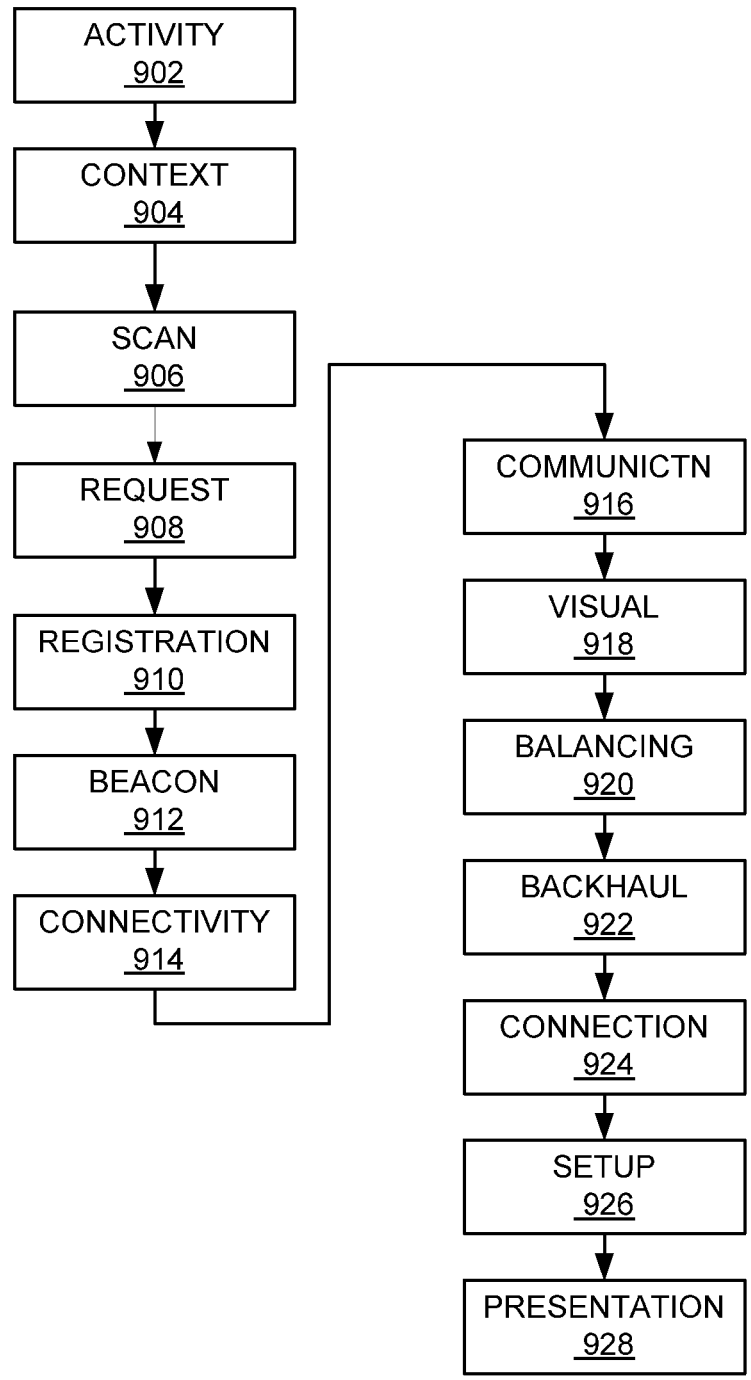
FIG. 9 is a first control flow of the computing system.

Referring now to FIG. 9, therein is shown a first control flow 900 of the computing system 100 of FIG. 1. For clarity and brevity, the discussion of the control flow 900 will focus on the first device 102 of FIG. 1, the second device 106 of FIG. 1, the third device 108 of FIG. 1 communicating amongst each other. However, the first device 102, the second device 106, the third device 108, or a combination thereof can be discussed interchangeably. The discussion of the specificity of the modules pertaining to the first device 102, the second device 106, the third device 108, or a combination thereof will be discussed when appropriate.

For further example, the first device 102 can represent the client device 204 of FIG. 2. The third device 108 can represent the external device 208 of FIG. 2. The second device 106 can represent the target device 206 of FIG. 2 communicated by the first device 102, the third device 108, or a combination thereof.

The computing system 100 can include an activity module 902. The activity module 902 determines the client presence factor 212 of FIG. 2. For example, the activity module 902 can determine the client presence factor 212 of the client device 204.

The activity module 902 can determine the client presence factor 212 in a number of ways. For example, the activity module 902 can determine the client presence factor 212 representing the gesture type 216 of FIG. 2 performed on the client device 204. More specifically, the activity module 902 can determine the gesture type 216 based on the user entry 218 of FIG. 2 performed on the client device 204.

For a specific example, the user entry 218 can represent pointing the client device 204 at the target device 206 in a line-of-sight. The activity module 902 can determine the gesture type 216 of the user entry 218 as pointing with the client device 204 based on the device orientation 416 of FIG. 4, the device movement 418 of FIG. 4, or a combination thereof.

The activity module 902 can determine the device orientation 416 based on a heading, pitch, roll, yaw, or a combination thereof of the client device 204 with the detecting sensor 420 of FIG. 4 representing the gyroscope, the compass, or a combination thereof. More specifically, the activity module 902 can determine the gesture type 216 as pointing when the client device 204 has the device orientation 416 of a heading of 170 degrees, −21 degrees of pitch, 20 degrees of roll, 90 degrees of yaw, or a combination thereof.

Furthermore, the activity module 902 can determine the gesture type 216 as pointing when the device movement 418 of the client device 204 is moving at 1.223 meters per second with a change in the device orientation 416 representing a change in roll of 0.2 degrees per second, a change in pitch of −0.5 degrees, or a combination thereof. As a result, the activity module 902 can determine the client presence factor 212 representing the gesture type 216 based on the device orientation 416, the device movement 418, or a combination thereof.

For another example, the activity module 902 can determine the gesture type 216 representing a squeeze based on the user entry 218 on the device side 422 of FIG. 4 of the client device 204. More specifically, the user entry 218 can make a contact on one instance of the device side 422 and another instance of the device side 422 opposite from the one instance. Furthermore, the contact made by the user entry 218 can have a duration of a specified time period, such as 2 seconds. Based on the user entry 218 made to the device side 422 of the client device 204, the activity module 902 can determine the gesture type 216 of a squeeze.

For a different example, the activity module 902 can determine the client presence factor 212 representing the client device location 214 of FIG. 2. More specifically, the activity module 902 can determine the client device location 214 with the location unit 820 of FIG. 8 to locate the physical location of the client device 204. The activity module 902 can communicate the client presence factor 212 to a context module 904.

The computing system 100 can include the context module 904, which can couple to the activity module 902. The context module 904 determines the discovery context 202 of FIG. 2. For example, the context module 904 can determine the discovery context 202 based on the client presence factor 212, the proximity boundary 222 of FIG. 2, or a combination thereof.

The context module 904 can determine the discovery context 202 in a number of ways. For example, the context module 904 can determine the discovery context 202 based on the client presence factor 212 representing the client device location 214. As discussed above, the client device location 214 can be determined with the location unit 820 that the user of the computing system 100 is in a living room of user's home. The context module 904 can determine the discovery context 202 that the user can be surrounded by a plurality of the target device 206.

For further example, the context module 904 can determine the discovery context 202 based on the proximity boundary 222. More specifically, the proximity boundary 222 can be established based on the location information where the client device 204 can be located. For example, the proximity boundary 222 can represent a house, room, stadium, office, vehicle, public venue, or a combination thereof.

The context module 904 can include the information regarding the proximity boundary 222. For example, the context module 904 can include the map information, such as a floor planning, to determine the proximity boundary 222 as the user's house. Moreover, the context module 904 can include the information regarding the target device 206 is situated within the proximity boundary 222. For another example, the context module 904 can communicate with the user's vehicle with the communication path 104 of FIG. 1 to determine the proximity boundary 222 to represent the user's vehicle. As a result, the context module 904 can determine the discovery context 202 based on the proximity boundary 222 where the client device location 214 is detected. The context module 904 can communicate the discovery context 202 to a scan module 906.

The computing system 100 can include the scan module 906, which can couple to the context module 904. The scan module 906 generates the scan pattern 402 of FIG. 4. For example, the scan module 906 can generate the scan pattern 402 based on the discovery context 202.

The scan module 906 can generate the scan pattern 402 in a number of ways. As discussed above, the discovery context 202 can represent the user's living room. And according to the floor plan of the user's living room, the living room can include a limited number of obstacles to obstruct the client device 204 communicating with the target device 206. The scan module 906 can determine the scan dimension 404 of FIG. 4 of the scan pattern 402 based on the discovery context 202 to adjust the scan range 414 of FIG. 4 of the scan pattern 402.

For a specific example, the scan module 906 can update the scan dimension 404 to adjust the scan pattern 402 for the discovery context 202. More specifically, the scan module 906 can update the scan dimension 404 including the pattern shape 406 of FIG. 4, the pattern angle 408 of FIG. 4, the pattern radius 410 of FIG. 4, the pattern height 412 of FIG. 4, or a combination thereof.

Continuing with the previous example, the discovery context 202 can represent the user's living room without an obstacle. Based on the discovery context 202, the scan module 906 can generate the scan pattern 402 having the pattern shape 406 of a cone. Moreover, since there is no obstacle within the proximity boundary 222, the scan module 906 can increase the pattern radius 410, decrease the pattern height 412, decrease the pattern angle 408, or a combination thereof to broaden the scan range 414.

For a different example, the discovery context 202 can represent a public venue with obstacles to interfere with the communication between the client device 204 and the target device 206. Based on the discovery context 202, the scan module 906 can decrease the pattern radius 410, increase the pattern height 412, increase the pattern angle 408, or a combination thereof to narrow the scan range 414.

For a different example, the scan module 906 can update the scan dimension 404 based on various other factors. As an example, the scan module 906 can change the scan dimension 404 based on the target device type 210 of FIG. 2, the device capability 332 of FIG. 3, the client presence factor 212, or a combination thereof. The target device type 210 can represent a TV. The surface area of the TV can be greater than the target device type 210 representing a speaker. The scan module 906 can generate the scan pattern 402 with the scan dimension 404 for a TV that is greater in size, volume, or a combination thereof than the scan dimension 404 for the target device type 210 representing a speaker.

For further example, the scan module 906 can determine the scan dimension 404 based on the device capability 332 of the client device 204. As an example, the device capability 332 can limit the scan pattern 402 to have the scan dimension 404 of a beam. As a result, the scan module 906 can generate the scan pattern 402 with the scan dimension 404 of a beam rather than a cone.

For further example, the scan module 906 can determine the scan dimension 404 based on the client presence factor 212. More specifically, the scan module 906 can determine the scan dimension 404 based on the gesture type 216, the device orientation 416, the device movement 418, or a combination thereof. The scan module 906 can adjust the scan dimension 404 based on the change in the gesture type 216, the device orientation 416, the device movement 418, or a combination thereof for improving the detection of the target device 206. More specifically, the scan module 906 can increase or decrease the scan dimension 404 based on the device orientation 416 meeting or exceeding the orientation threshold 424 of FIG. 4, the device movement 418 meeting or exceeding the movement threshold 426 of FIG. 4, or a combination thereof.

For a specific example, the device orientation 416 can represent 10 degrees of roll, 270 degrees of yaw, −20 degrees of pitch, or a combination thereof. Moreover, the gesture type 216 can represent a slow panning movement with the device movement 418 of moving at 0.5 meters per second with a change in the device orientation 416 representing a change in roll of 0.2 degrees per second, a change in pitch of −0.5 degrees per second, a change in yaw of 20 degrees per second, or a combination thereof to scan the proximity boundary 222. The movement threshold 426 can represent 1 meter per second. The device movement 418 can be below the movement threshold 426. As a result, the scan module 906 can decrease the pattern radius 410 to narrow the scan dimension 404.

For a different example, the device movement 418 can represent the client device 204 moving at 3 meters per second with a change in the device orientation 416 representing a change in roll of 0.2 degrees per second, a change in pitch of 5 degrees per second, a change in yaw of 90 degrees per second, or a combination thereof. The orientation threshold 424 can represent the change in yaw of 45 degrees per second. Based on the device orientation 416 exceeding the orientation threshold 424, the scan module 906 can increase the pattern radius 410 to broaden the scan dimension 404 for improving the detection of the target device 206. The scan module 906 can communicate the scan pattern 402 to a request module 908.

It has been discovered that the computing system 100 determining the scan dimension 404 improves the accuracy of discovering the target device 206. By changing the scan dimension 404 according to various factors, including the discovery context 202, the device capability 332, the client presence factor 212, or a combination thereof, the computing system 100 can efficiently discover the target device 206. As a result, the computing system 100 can enhance the user experience operating the computing system 100, the client device 204, the target device 206, or a combination thereof.

The computing system 100 can include the request module 908, which can couple to the scan module 906. The request module 908 transmits the discovery request 302 of FIG. 3. For example, the request module 908 can transmit the discovery request 302 including the scan pattern 402 for discovering the target device 206.

The request module 908 can transmit the discovery request 302 in a number of ways. As discussed above, the request module 908 can transmit the discovery request 302 including the scan pattern 402 for detecting the target device 206. For further example, the request module 908 can transmit the discovery request 302 including the transmission time 304 of FIG. 3, the client presence factor 212, or a combination thereof.

More specifically, the request module 908 can include the client device location 214, the device orientation 416, the device movement 418, the gesture type 216, or a combination thereof of at the transmission time 304 of discovery request 302. As an example, the client device location 214 can be detected within the proximity boundary 222 of a living room. The gesture type 216 determined can represent pointing the client device 204. The device orientation 416 of a heading of 170 degrees, −21 degrees of pitch, 20 degrees of roll, 90 degrees of yaw, or a combination thereof.

The device movement 418 can represent the client device 204 moving at 1.223 meters per second with a change in the device orientation 416 representing a change in roll of 0.2 degrees per second, a change in pitch of −0.5 degrees, or a combination thereof. The request module 908 can transmit the discovery request 302 in the form of the scan pattern 402 including the client device location 214, the device orientation 416, the device movement 418, the gesture type 216, the transmission time 304, or a combination thereof. The request module 908 can communicate the discovery request 302 to a registration module 910, a beacon module 912, or a combination thereof.

The computing system 100 can include the registration module 910, which can couple to the request module 908. The registration module 910 registers the client presence factor 212. For example, the registration module 910 can register the client presence factor 212 at the transmission time 304.

More specifically, the registration module 910 can register the gesture type 216, the device movement 418, the device orientation 416, the client device location 214 at the transmission time 304 when the discovery request 302 is transmitted to the target device 206. The registration module 910 can register the client presence factor 212 by storing in the first storage unit 814 of FIG. 8 as an example.

The computing system 100 can include the beacon module 912, which can couple to the request module 908. The beacon module 912 determines the target device coordinate 224 of FIG. 2. For example, the beacon module 912 can determine the target device coordinate 224 including the coordinate type 226 of FIG. 2 of the relative device coordinate 228 of FIG. 2, the absolute device coordinate 230 of FIG. 2, or a combination thereof.

The beacon module 912 can determine the target device coordinate 224 in a number of ways. For example, the beacon module 912 can determine the absolute device coordinate 230 based on the discovery request 302, the client presence factor 212, the proximity boundary 222, or a combination thereof. More specifically, the beacon module 912 can include the information regarding a plurality of the target device coordinate 224 within the proximity boundary 222. The proximity boundary 222 can represent a living room. The living room can include a plurality of the target device type 210 including a TV, speaker, a set-top box, or a combination thereof. Each of the target device type 210 can include the beacon module 912 to communicate amongst the client device 204, the plurality of the target device 206, or a combination thereof.

As an example, the beacon module 912 can determine the absolute device coordinate 230 based on retrieving the information for the target device coordinate 224 within the proximity boundary 222 from the second storage unit 846 of FIG. 8. For a different example, the beacon module 912 from each instances of the target device 206 can communicate via the communication path 104 representing Bluetooth, WiFi, GPS, received signal strength indicator (RSSI), cellular triangulation, or a combination thereof to determine the absolute device coordinate 230 of each instances of the target device 206.

For further example, the beacon module 912 can determine the device distance 232 of FIG. 2 between the client device 204 and the target device 206. The beacon module 912 can calculate the device distance 232 based on comparing the absolute device coordinate 230 of the target device 206 to the client device location 214.

For a different example, the beacon module 912 can determine the relative device coordinate 228 based on the discovery request 302, the client presence factor 212, the proximity boundary 222, or a combination thereof. More specifically, the client presence factor 212 can include the device orientation 416 of the client device 204. The device orientation 416 included in the discovery request 302 can indicate that the client device 204 transmitted the discovery request 302 towards the northwest coordinate of the cardinal direction according to the detecting sensor 420 representing a compass of the client device 204. The beacon module 912 can determine that the client device 204 is located at the southeast coordinate or 135 degree of the cardinal direction relative to the target device 206. As a result, the beacon module 912 can determine the relative device coordinate 228 to represent southeast coordinate relative to the client device location 214 of the client device 204.

For further example, the client presence factor 212 can include the device movement 418. The device movement 418 can indicate that the client device 204 is heading towards the northeast direction at 1.0 meter per second. More specifically, the beacon module 912 can calculate the change in the client device location 214 based on the device movement 418. As discussed above, the at the transmission time 304, the client device 204 can locate at southeast coordinate relative to the target device 206. Based on the device movement 418 of heading towards the northeast direction, the beacon module 912 can determine the relative device coordinate 228 is changing from the southeast coordinate to the east coordinate.

For further example, the beacon module 912 can determine the relative device coordinate 228 in relation to the client device location 214 within the proximity boundary 222. For example, the target device 206 can represent a TV. The absolute device coordinate 230 of the TV can locate at the north end of the proximity boundary 222 representing a living room. If the device movement 418 of the client device 204 is moving towards the east direction relative to the TV, the beacon module 912 can determine that the client device 204 is heading towards the proximity boundary 222 of a kitchen.

For further example, one instance of the beacon module 912 of one instance of the target device 206 can share the relative device coordinate 228 to another instance of the beacon module 912 of another instance of the target device 206. Moreover, the another instance of the beacon module 912 can determine the relative device coordinate 228 from the client device 204 based on the relative device coordinate 228 received from the one instance of the beacon module 912.

As an example, one instance of the beacon module 912 can be included within the target device 206 representing a TV. Further, another instance of the beacon module 912 can be included within the target device 206 representing a stereo. The relative device coordinate 228 of the TV is west coordinate to the stereo. The client device 204 can be determined to locate at the southeast coordinate of the TV. As a result, the beacon module 912 of the stereo can determine the relative device coordinate 228 of southwest coordinate in relation to the client device 204. The beacon module 912 can communicate the target device coordinate 224 to a connectivity module 914.

It has been discovered that the computing system 100 determining the relative device coordinate 228 can improve the efficiency and accuracy of the client device 204 communicating with the target device 206. By considering the relative device coordinate 228, the computing system 100 can determine whether the user intended to communicate with the target device 206 or not. As a result, the computing system 100 can enhance the user experience of operating the client device 204, the target device 206, the computing system 100, or a combination thereof.

The computing system 100 can include the connectivity module 914, which can couple to the beacon module 912. The connectivity module 914 determines the device connectivity 316 of FIG. 3. For example, the connectivity module 914 can determine the device connectivity 316 between client device 204 and the target device 206.

The connectivity module 914 can determine the device connectivity 316 in a number of ways. For example, the connectivity module 914 can determine the device connectivity 316 based on the client presence factor 212, the target device coordinate 224, the target device type 210, or a combination thereof. More specifically, the target device type 210 can represent a TV. The relative device coordinate 228 of the TV in relation to the client device 204 can represent the client device location 214 to locate in front of the TV. The connectivity module 914 can determine the device connectivity 316 of "yes" based on the relative device coordinate 228 and the client device location 214 for inferring the user's intent 236 of FIG. 2 to connect the client device 204 to the TV.

In contrast, the client device location 214 can locate behind the TV. The connectivity module 914 can determine the device connectivity 316 of "no" between the TV and the client device 204. More specifically, the connectivity module 914 can determine the user's intent 236 to not to connect the client device 204 to the TV based on the relative device coordinate 228 of the TV to the client device location 214. But rather, the connectivity module 914 can determine the device connectivity 316 of "yes" between the target device type 210 representing a stereo instead based on the relative device coordinate 228 of the stereo to the client device location 214.

For a different example, the connectivity module 914 can determine the device connectivity 316 based on the gesture type 216, the device orientation 416, the device movement 418, or a combination thereof. The device connectivity 316 to a particular instance of the target device type 210 can be preset according to a specific instance of the gesture type 216. For a specific example, the connectivity module 914 can determine the device connectivity 316 of "yes" to a TV if the gesture type 216 represents pointing the client device 204. For a different example, the connectivity module 914 can determine the device connectivity 316 of "yes" to a stereo if the gesture type 216 represents a squeeze on the both side of the device side 422 of the client device 204.

For further example, the connectivity module 914 can determine the device connectivity 316 based on the device orientation 416 compared to the orientation threshold 424. As an example, if the device orientation 416 meets or exceeds the orientation threshold 424, the connectivity module 914 can determine the device connectivity 316 to represent "no." In contrast, if the device orientation 416 is below the orientation threshold 424, the connectivity module 914 can determine the device connectivity 316 to represent "yes."

For a specific example, the orientation threshold 424 can represent 45 degrees of pitch. If the device orientation 416 has the pitch of 90 degrees, the connectivity module 914 can determine the device connectivity 316 of "no." But rather, the connectivity module 914 can determine that the user's intent 236 is to operate the client device 204 without the connection with the target device 206. In contrast, if the device orientation 416 has the pitch of 20 degrees, the connectivity module 914 can determine the device connectivity 316 of "yes."

For further example, the connectivity module 914 can determine the device connectivity 316 based on the device movement 418 compared to the movement threshold 426. More specifically, if the device movement 418 meets or exceeds the movement threshold 426, the connectivity module 914 can determine the device connectivity 316 to represent "no." In contrast, if the device movement 418 is below the movement threshold 426, the connectivity module 914 can determine the device connectivity 316 to represent "yes." The connectivity module 914 can communicate the device connectivity 316 to a communication module 916.

The computing system 100 can include the communication module 916, which can couple to the connectivity module 914. The communication module 916 communicates the discovery communication 306 of FIG. 3. For example, the communication module 916 can communicate the discovery communication 306 based on the communication type 308 of FIG. 3 including the discovery response 310 of FIG. 3, the discovery packet 312 of FIG. 3, or a combination thereof.

The communication module 916 can communicate the discovery communication 306 in a number of ways. For example, the communication module 916 can communicate the discovery response 310 including the device connectivity 316, the target device coordinate 224, the device information 314 of FIG. 3, or a combination thereof based on the discovery request 302.

As discussed above, the device connectivity 316 can include "yes" or "no" for whether the client device 204 can connect to the target device 206. Further the target device coordinate 224 can include the relative device coordinate 228, the absolute device coordinate 230, or a combination thereof to disclose where the target device 206 is relative to the client device 204. The device information 314 can include the device name of the target device 206, the device ID of the target device 206, the manufacture ID, the model ID, the backhaul channel 320 of FIG. 3 supported by the target device 206, or a combination thereof. The backhaul channel 320 can allow bidirectional connection, omnidirectional connection, or a combination thereof between the client device 204 and the target device 206. The communication module 916 can communicate the discovery response 310 including the above in response to the discovery request 302.

For a different example, the communication module 916 can broadcast the device connectivity 316, the target device coordinate 224, the device information 314, or a combination thereof as part of the discovery packet 312. More specifically, the communication module 916 can broadcast the device connectivity 316 without the discovery request 302. Moreover, the communication module 916 can broadcast the discovery packet 312 within the proximity boundary 222. The communication module 916 can communicate the discovery communication 306 to a visualization module 918.

The computing system 100 can include the visualization module 918, which can couple to the communication module 916. The visualization module 918 generates the device visualization 502 of FIG. 5. For example, the visualization module 918 can generate the device visualization 502 based on the connection confirmation 344, the proximity boundary 222, or a combination thereof. For another example, the visualization module 918 can generate the device visualization 502 including the micro view 510, the macro view 512, or a combination thereof.

The visualization module 918 can generate the device visualization 502 in a number of ways. For example, the visualization module 918 can generate the device visualization 502 including the client device 204 and the target device 206. More specifically, the visualization module 918 can generate the device visualization 502 including the relative device coordinate 228 of the target device 206 to the client device 204, the absolute device coordinate 230 of the target device 206, or a combination thereof for displaying on the display interface 220 of FIG. 2 of the client device 204.

For further example, the visualization module 918 can include the device image 504 of FIG. 5 of the client device 204, the target device 206, or a combination thereof stored in the first storage unit 814. If the device image 504 is unavailable, the client device 204, the target device 206, or a combination thereof can download from the external device 208.

For further example, the visualization module 918 can generate the device visualization 502 based on the device image 504 of the client device 204, the target device 206, or a combination thereof in the relative location specified by the relative device coordinate 228, the absolute device coordinate 230, or a combination thereof. Moreover, the visualization module 918 can generate the device visualization 502 including the proximity boundary 222 to display the target device 206 at the relative device coordinate 228, the absolute device coordinate 230, or a combination thereof in the proximity boundary 222.

For another example, the visualization module 918 can generate the device visualization 502 including the micro view 510, the macro view 512, or a combination thereof. As an example, the visualization module 918 can generate the micro view 510, the macro view 512, or a combination thereof based on the device distance 232 meeting or exceeding the distance threshold 234. More specifically, the visualization module 918 can generate the macro view 512 if the device distance 232 meeting or exceeding the distance threshold 234. In contrast, the visualization module 918 can generate the micro view 510 if the device distance 232 is below the distance threshold 234.

For another example, the visualization module 918 can generate the micro view 510, the macro view 512, or a combination thereof based on the target device coordinate 224. More specifically, the visualization module 918 can generate the micro view 510, the macro view 512, or a combination thereof displaying the device image 504 of the client device 204, the target device 206, or a combination thereof in the relative location specified by the relative device coordinate 228, the absolute device coordinate 230, or a combination thereof.

The physical transformation for discovering the target device 206 results in the movement in the physical world, such as people using the first device 102, the second device 106, the third device 108, or a combination thereof, based on the operation of the computing system 100. As the movement in the physical world occurs, the movement itself creates additional information that is converted back into generating the target device coordinate 224, the device visualization 502, or a combination thereof for displaying the device image 504 of the client device 204, the target device 206, or a combination thereof within the proximity boundary 222 for the continued operation of the computing system 100 and to continue movement in the physical world.

The computing system 100 can include a balancing module 920. The balancing module 920 determines the transmission factor 322 of FIG. 3. For example, the balancing module 920 can determine the transmission factor 322 based on the discovery communication 306.

The balancing module 920 can determine the transmission factor 322 in a number of ways. For example, the balancing module 920 can determine the transmission factor 322 including the transmission requirement 324 of FIG. 3, the transmission preference 326 of FIG. 3, the transmission condition 328 of FIG. 3, the transmission power 428 of FIG. 4, or a combination thereof.

For a specific example, the balancing module 920 can determine the transmission requirement 324 based on the device content 330 of FIG. 3, the device capability 332, or a combination thereof. More specifically, the device content 330 can require the backhaul channel 320 representing WiFi for transmitting data between the client device 204 and the target device 206. As a result, the balancing module 920 can determine the transmission requirement 324 of the backhaul channel 320 representing WiFi based on the device content 330.

For a different example, the device capability 332 of the client device 204 can include communicating with infrared but not NFC. As a result, the balancing module 920 can determine the transmission requirement 324 of communicating with infrared based on the device capability 332. For another example, the device capability 332 of the client device 204 can include communicating with WiFi but not infrared. As a result, the balancing module 920 can determine the transmission requirement 324 of utilizing the reverse discovery 602 of FIG. 6 as discussed above.

For another example, the balancing module 920 can determine the transmission preference 326 based on the device information 314 delivered with the discovery communication 306. More specifically, the device information 314 can include that the target device 206 prefers communicating with the client device 204 via an offline communication, such as PAN, instead of online communication, such as WiFi. As a result, the balancing module 920 can determine the transmission preference 326 of communicating with PAN based on the device information 314.

For another example, the balancing module 920 can determine the transmission condition 328. As an example, the transmission condition 328 can include the environmental factor 334 of FIG. 3, the service cost 336 of FIG. 3 of the backhaul channel 320, or a combination thereof. More specifically, the environmental factor 334 can represent the radio frequency noise within the proximity boundary 222. The balancing module 920 can determine the environmental factor 334 representing the noise level within the proximity boundary 222 with the detecting sensor 420 representing a spectrum analyzer.

For further example, the balancing module 920 can determine the service cost 336 for communicating with a particular instance of the channel type 318 of FIG. 3. As an example, the balancing module 920 can determine the service cost 336 based on the estimated energy consumption by the client device 204 for communicating with particular instance of the channel type 318. For a different example, the balancing module 920 can determine the service cost 336 based on the transmission time for how long to complete the communication between the client device 204 and the target device 206.

For another example, the balancing module 920 can calibrate the transmission power 428 based on the discovery communication 306. More specifically, the balancing module 920 can calibrate the transmission power 428 by increasing or decreasing the transmission power 428 based on the feedback received from the discovery communication 306.

For example, if the target device 206 received the discovery request 302 from the client device 204, the target device 206 can transmit the discovery communication 306 as a feedback. Based on the discovery communication 306 received by the client device 204, the balancing module 902 can calibrate the transmission power 428 as full power to sustain a presence awareness of the client device 204 and the target device 206 within the proximity boundary 222. In contrast, if the client device 204 no longer receives the discovery communication 306, the balancing module 920 can calibrate the transmission power 428 by reducing the power. The balancing module 920 can communicate the transmission factor 322 to a backhaul module 922.

The computing system 100 can include the backhaul module 922, which can couple to the balancing module 920. The backhaul module 922 can determine the channel type 318. For example, the backhaul module 922 can determine the channel type 318 of the backhaul channel 320 for communicating with the target device 206.

The backhaul module 922 can determine the channel type 318 in a number of ways. For example, the backhaul module 922 can determine the channel type 318 based on the transmission factor 322 including the transmission requirement 324, the transmission preference 326, the transmission condition 328, or a combination thereof. As discussed above, the transmission requirement 324 can represent communicating with infrared based on the device capability 332 of the client device 204. As a result, the backhaul module 922 can determine the channel type 318 to represent infrared. For a different example, the transmission preference 326 for the target device 206 can represent communicating with WiFi. The backhaul module 922 can determine the channel type 318 to represent WiFi.

For further example, the backhaul module 922 can determine the channel type 318 based on the transmission factor 322 for overriding the transmission requirement 324, the transmission preference 326, or a combination thereof. More specifically, the transmission requirement 324 or the transmission preference 326 can require or prefer the communication between the client device 204 and the target device 206 to be conducted over the channel type 318 of the backhaul channel 320 represent infrared. However, the service cost 336 for transmitting data over infrared can be greater than the backhaul channel 320 representing WiFi. As a result, the backhaul module 922 can override the transmission requirement 324 to determine the channel type 318 to represent WiFi instead of infrared. The backhaul module 922 can communicate the connection request 338 of FIG. 3 including the channel type 318 to a connection module 924.

The computing system 100 can include the connection module 924, which can couple to the backhaul module 922. The connection module 924 communicates the connection response 340 of FIG. 3. For example, the connection module 924 can communicate the connection response 340 including the response type 342 of FIG. 3 including the connection confirmation 344 of FIG. 3, the connection directive 346 of FIG. 3, or a combination thereof.

The connection module 924 can communicate the connection response 340 in a number of ways. For example, the connection module 924 can communicate the connection confirmation 344 based on the connection request 338, the channel connectibility 348 of FIG. 3, or a combination thereof. As an example, the connection request 338 can indicate the client device 204 requesting the channel type 318 of WiFi communication for the backhaul channel 320. The channel connectibility 348 by the target device 206 for WiFi communication can represent "yes." As a result, the connection module 924 can communicate the connection confirmation 344 of "yes" to notify the client device 204 for connecting to the target device 206 via WiFi.

In contrast, if the target device 206 is unable to setup communication with a particular instance of the channel type 318, the channel connectibility 348 can represent an "error" or "no." As a result, the connection module 924 can communicate the connection confirmation 344 of "no" to notify the client device 204 the inability to connect via the particular instance of the channel type 318 to the target device 206.

For further example, the connection module 924 can communicate the connection directive 346 based on the channel connectibility 348. More specifically, if the channel connectibility 348 is "error" or "no," the connection module 924 can communicate the connection directive 346 for specifying the backhaul channel 320 the client device 204 can communicate with the target device 206. The connection module 924 can communicate the connection response 340 to a setup module 926.

The computing system 100 can include the setup module 926, which can couple to the connection module 924. The setup module 926 establishes the backhaul communication 350 of FIG. 3. For example, the setup module 926 can establish the backhaul communication 350 based on the connection response 340.

The setup module 926 can establish the backhaul communication 350 in a number of ways. For example, the setup module 926 can establish the backhaul communication 350 based on the connection confirmation 344, the connection directive 346, or a combination thereof. If the connection confirmation 344 is "yes," the setup module 926 can establish the backhaul communication 350 with the target device 206 with the channel type 318 as requested by the client device 204. Moreover, the setup module 926 can establish the backhaul communication 350 including authentication, permission, encryption negotiation, or a combination thereof.

In contrast, if the connection confirmation 344 is "no," the client device 204 can resend the connection request 338 to renegotiate the channel type 318 to connect with the target device 206. For a different example, if the setup module 926 received the connection directive 346, the setup module 926 can establish the backhaul communication 350 as specified in the connection directive 346. If the device capability 332 of the client device 204 does not permit the channel type 318 specified in the connection directive 346, the client device 204 can send the connection request 338 again to renegotiate for the channel type 318 to connect with the target device 206.

For a different example, the setup module 926 can establish the backhaul communication 350 based on a plurality of the channel type 318 available for connection. For example, the connection directive 346 can include a list of the channel type 318 available for the backhaul communication 350. The setup module 926 can establish the backhaul communication 350 based on the device capability 332, the transmission factor 322, or a combination thereof by selecting from the list of a plurality of the channel type 318.

For further example, if the backhaul channel 320 becomes unavailable, the setup module 926 can change the backhaul communication 350 dynamically by establishing the connection via other available instance of the backhaul channel 320. For a different example, the setup module 926 can renegotiate to reestablish the same instance of the backhaul communication 350. The renegotiation can start from the client device 204 communicating the discovery request 302 with scan pattern 402, the connection request 338, or a combination thereof.

For further example, the setup module 926 can pause the backhaul communication 350 based on the transmission condition 328. More specifically, the transmission condition 328 can include factors, such as range, bandwidth, throughput, reliability, robustness, quality of service, or a combination thereof. If the transmission condition 328 dips below the condition threshold 352 of FIG. 3, the setup module 926 can pause the backhaul communication 350, change for a different instance of the backhaul channel 320, renegotiate to reestablish the connection with the same instance of the backhaul channel 320, or a combination thereof.

For illustrative purposes, the computing system 100 is shown with the visualization module 918 generating the device visualization 502 based on the target device coordinate 224, although the visualization module 918 can be operated differently. For example, the visualization module 918 can generate the device visualization 502 based on the backhaul communication 350.

For a specific example, the visualization module 918 can generate the micro view 518 if the backhaul communication 350 is established. More specifically, the visualization module 918 can generate the micro view 518 displaying the device image 504 of the target device 206 that the client device 204 had established the backhaul communication 350 without other instances of the device image 504.

The computing system 100 can include a presentation module 928, which can couple to the setup module 926. The presentation module 928 presents information related to the devices discovered. For example, the presentation module 928 can display the device visualization 502 based on the mode type 514 of FIG. 5.

The presentation module 928 can present in a number of ways. For example, the presentation module 928 can display the device visualization 502 based on the mode type 514 representing the sleep mode 518 of FIG. 5. More specifically, the display interface 220 of the client device 204 can be in the sleep mode 518. Once the detecting sensor 420 of the client device 204 detects the target device 206, the display interface 220 can display the device visualization 502.

For a specific example, the presentation module 928 can display the device visualization 502 based on the relative device coordinate 228 representing a line-of-sight. More specifically, the client device 204 and the target device 206 can be in the line-or-sight if the relative device coordinate 228 indicates that the device distance 232 between the client device 204 and the target device 206 is within the distance threshold 234.

More specifically, the presentation module 928 can display the device visualization 502 based on the discovery communication 306 received in response to the discovery request 302 sent with the scan pattern 402 having the scan dimension 404 of a beam. By having the beam pointing directly to the target device 206 in the line-of-sight, the presentation module 928 can determine the device visualization 302 for the particular instance of the target device 206 that should be displayed. As a result, the display interface 220 can display the device image 504 of the target device 206 of interest.

For a different example, the presentation module 928 can display the device visualization 502 based on the mode type 514 representing the awake mode 516 of FIG. 5. The display interface 220 can already be displaying the device visualization 502 of some other device, content, information, or a combination thereof. If the client device 204 discovers a different instance of the target device 206, the display interface 220 can display the notification 520 of FIG. 5 to indicate the new discovery. For further example, while the notification 520 is displayed, the user can make the user entry 218 of manual entry, gesture, voice command, or a combination thereof for the presentation module 928 to fully display the device image 504 of the target device 206 newly discovered on the display interface 220.

For a different example, the presentation module 928 can present the notification 520 representing an auditory feedback, haptic feedback, or a combination thereof after discovering the target device 206. For a specific example, the presentation module 928 can generate the notification 520 representing the audio information for reading out the name of the target device 206 within the line-of-sight by the client device 204. For another example, the presentation module 928 can provide the notification 520 representing a vibration to indicate that the target device 206 is in the line-of-sight. More specifically, the presentation module 928 can present the vibration in a variety of pattern to specify a particular instance of the target device 208.

For a different example, the presentation module 928 can display the device visualization 502 based on the trust level 522 of FIG. 5 of the target device 206. More specifically, the display interface 220 of the target device 206 can display the information regarding the client device 204 based on the trust level 522.

For a specific example, the trust level 522 can represent "trusted" for the target device 206 because the target device 206 is owned by the same user of the client device 204, owned by a trusted entity, had been paired in the past, or a combination thereof. As a result, the client device 204 can share the device information 314 of the client device 204 to the target device 206 via the backhaul communication 350. The presentation module 928 can display the device information 314 of the client device 204 on the display interface 220 of the target device 206. In contrast, if the trust level 522 represents "not trusted," "unverified," or a combination thereof, the display interface 220 of the target device 206 will not display the device information 314 of the client device 204.

Figure 10:
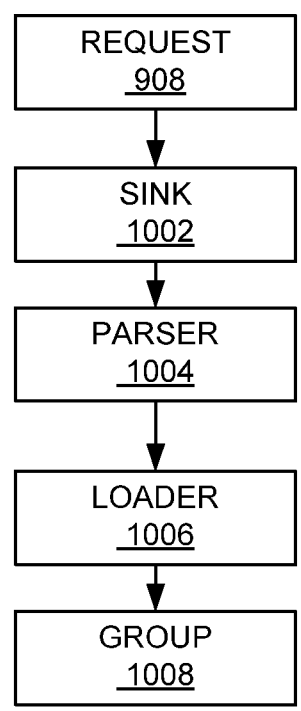
FIG. 10 is a second control flow of the computing system.

Referring now to FIG. 10, therein is shown a second control flow 1000 of the computing system 100 of FIG. 1. For clarity and brevity, the discussion of the control flow 1000 will focus on the first device 102 of FIG. 1, the second device 106 of FIG. 1, the third device 108 of FIG. 1 communicating amongst each other. However, the first device 102, the second device 106, the third device 108, or a combination thereof can be discussed interchangeably. The discussion of the specificity of the modules pertaining to the first device 102, the second device 106, the third device 108, or a combination thereof will be discussed when appropriate.

For a specific example, the first device 102 can represent the client device 204 of FIG. 2. The third device 108 can represent the external device 208 of FIG. 2. The second device 106 can represent the target device 206 of FIG. 2 communicated by the first device 102, the third device 108, or a combination thereof. For further example, the modules discussed below can control, change, or a combination thereof the backhaul communication 350 of FIG. 3 based on the transmission factor 322 of FIG. 3 similarly as the modules discussed above.

For illustrative purpose, the computing system 100 is described with the request module 908 transmitting the discovery request module 908, although the request module 908 can operate differently. For example, the request module 908 can transmit the information request 354 of FIG. 3 for requesting the meta-information 356 of FIG. 3 from the target device 206, the external device 208, or a combination thereof.

The request module 908 can transmit the information request 354 in a number of ways. For example, the request module 908 can transmit the information request 354 based on the client presence factor 212 of FIG. 2, the proximity boundary 222 of FIG. 2, the backhaul channel 320 of FIG. 3, or a combination thereof. As an example, the request module 908 can transmit the information request 354 when the client device 204 is within the proximity boundary 222. More specifically, the request module 908 can transmit the information request 354 when the client device 204 is within the device distance 232 of FIG. 2 from the target device 206.

For a different example, the request module 908 can transmit the information request 354 based on the gesture type 216 of FIG. 2. More specifically, the request module 908 can transmit the information request 354 when the user performs the gesture type 216 representing pointing the client device 204 to the target device 206.

For further example, the request module 908 can transmit the information request 354 in the form of the scan pattern 402, via the backhaul communication 350, or a combination thereof. The request module 908 can communicate the information request 354 to a sink module 1002.

The computing system 100 can include the sink module 1002, which can couple to the request module 908. The sink module 1002 communicates the meta-information 356. For example, the sink module 1002 can communicate the meta-information 356 based on the information request 354.

For a different example, the sink module 1002 can download the installation content 358 of FIG. 3 from the external device 208. More specifically, the information request 354 can indicate that the client device 204 lacks the most updated version of the installation content 358, such as software application, driver, or a combination thereof. Moreover, if the target device 206 also does not have the installation content 358 or does not have the latest version of the installation content 358, the sink module 1002 can fetch the installation content 358 from the external device 208. The sink module 1002 can communicate the meta-information 356 to a parser module 1004.

The computing system 100 can include the parser module 1004, which can couple to the sink module 1002. The parser module 1004 determines the content sufficiency 360 of FIG. 3. For example, the parser module 1004 can determine the content sufficiency 360 based on parsing the meta-information 356.

More specifically, the parser module 1004 can determine the content sufficiency 360 of the device content 330 by comparing the device content 330 to the meta-information 356. Based on comparing to the meta-information 356, the parser module 1004 can determine whether the device content 330 is the latest version or not. If the parser module 1004 determines that the device content 330 is not the latest version, the parser module 1004 can request the latest version of the installation content 358 for the device content 330 from the target device 206, the external device 208, or a combination thereof.

For a specific example, the client device 204 and the target device 206 can establish backhaul communication 350 based on PAN, an offline connection. Thus, the client device 204 and the target device 206 may not be connected to the external device 208 via the communication path 104, such as WiFi, an online connection. If the parser module 1004 determines that the device content 330 is not the latest version, the parser module 1004 can request the latest version of the installation content 358 for the device content 330 from the target device 206 to side load the installation content 358 on the client device 204. The parser module 1004 can communicate the content sufficiency 360 to a loader module 1006.

The computing system 100 can include the loader module 1006, which can couple to the parser module 1004. The loader module 1006 installs the installation content 358, generates the pre-cached content 506 of FIG. 5, or a combination thereof. For example, the loader module 1006 can install the installation content 358 based on the content sufficiency 360. For another example, the loader module 1006 can generate the pre-cached content 506 based on the installation content 358.

The loader module 1006 can install, generate, or a combination thereof in a number of ways. For example, the loader module 1006 can install the installation content 358 based on the content sufficiency 360 for ensuring the client device 204 can interact with the target device 206. More specifically, the loader module 1006 can install the installation content 358 representing an interface descriptor, application, driver, or a combination thereof which was determined to have the content sufficiency 360 of the latest version for interacting with the target device 206.

For a different example, the loader module 1006 can generate the pre-cached content 506 based on the meta-information 356, the client presence factor 212, the installation content 358, or a combination thereof. More specifically, the loader module 1006 can have the installation content 358 from previous interaction with the target device 206.

The client device 204 can end communication with the target device 206 by leaving the proximity boundary 222. However, the client device 204 can return to the proximity boundary 222. More specifically, the client device location 214 can be within the proximity boundary 222. The loader module 1006 can generate the pre-cached content 506 with the installation content 358 previously downloaded, or a combination thereof based on locating the client device location 214 within the proximity boundary 222 for improving access to the device content 330 to interact with the target device 206. For another example, the loader module 1006 can generate the pre-cached content 506 representing the device visualization 502 of FIG. 5 of the proximity boundary 222, the device image 504 of FIG. 5, or a combination thereof the client device location 214 previously located.

For a different example, the loader module 1006 can uninstall the device content 330, the installation content 358, or a combination thereof based on the client device location 214, the target device coordinate 224 of FIG. 2, or a combination thereof. More specifically, the loader module 1006 can uninstall the device content 330 if the client device 204 is outside of the proximity boundary 222. For further example, the loader module 1006 can uninstall the device content 330 if the device distance 232 of FIG. 2 between the client device 204 and the target device 206 meets or exceeds the distance threshold 234 of FIG. 2.

For a different example, the loader module 1006 can remove the pre-cached content 506 based on meeting or exceeding the time threshold 508 of FIG. 5, the client presence factor 212, or a combination thereof. More specifically, the time threshold 508 can be set to 30 minutes. If the user of the computing system 100 fails to make the user entry 218 of FIG. 2 by performing the gesture type 216 of FIG. 2 to interact with the target device 206 for 30 minutes or more, the loader module 1006 can remove the pre-cached content 506. For further example, the loader module 1006 can remove the pre-cached content 506 if the client device location 214 is outside of the proximity boundary 222 beyond the duration of the time threshold 508.

The computing system 100 can include a group module 1008, which can couple to the loader module 1006. The group module 1008 generates the interaction group 238 of FIG. 2. For example, the group module 1008 can generate the interaction group 238 based on the backhaul communication 350.

More specifically, the group module 1008 can generate the interaction group 238 including a plurality of the client device 204. For example, an instance of the client device 204 can already have the backhaul communication 350 established. Another instance of the client device 204 can enter the proximity boundary 222 to interact with the same instance of the target device 206. Once the another instance of the client device 204 has established the backhaul communication 350 with the same category of the channel type 318, the group module 1008 can generate the interaction group 238 to include both instances of the client device 204.'

For further example, the group module 1008 can remove the client device 204 from the interaction group 238. More specifically, the client device 204 can have the backhaul communication 350 remained established when being removed by the group module 1008 from the interaction group 238.

For another example, the group module 1008 can generate the interaction group 238 based on the user's intent 236 of FIG. 2. As an example, the group module 1008 can generate the interaction group 238 based on the user's intent 236 representing taking pictures by a plurality of the client device 204 to be displayed on the target device 206. Another instance of the client device 204 can establish the backhaul communication 350 to access the pictures in a shared drive of the target device 206. The group module 1008 can include the third instance of the client device 204 in the interaction group 238.

The first software 826 of FIG. 8 of the first device 102 of FIG. 8 can include the computing system 100. For example, the first software 826 can include the activity module 902 of FIG. 9, the context module 904 of FIG. 9, the scan module 906 of FIG. 9, the request module 908, the registration module 910 of FIG. 9, the beacon module 912 of FIG. 9, the connectivity module 914 of FIG. 9, the communication module 916 of FIG. 9, the visualization module 918 of FIG. 9, the balancing module 920 of FIG. 9, the backhaul module 922 of FIG. 9, the connection module 924 of FIG. 9, the setup module 926 of FIG. 9, and the presentation module 928 of FIG. 9. For further example, the first software 826 can include the sink module 1002, the parser module 1004, the loader module 1006, and the group module 1008.

The first control unit 812 of FIG. 8 can execute the first software 826 for the activity module 902 to determine the client presence factor 212. The first control unit 812 can execute the first software 826 for the context module 904 to discover the discovery context 202. The first control unit 812 can execute the first software 826 for the scan module 906 to generate the scan pattern 402.

The first control unit 812 can execute the first software 826 for the request module 908 to transmit the discovery request 302, the information request 354, or a combination thereof. The first control unit 812 can execute the first software 826 for the registration module 910 to register the client presence factor 212. The first control unit 812 can execute the first software 826 for the beacon module 912 to determine the target device coordinate 224.

The first control unit 812 can execute the first software 826 for the connectivity module 914 to determine the device connectivity 316. The first control unit 812 can execute the first software 826 for the communication module 916 to communicate the discovery communication 306. The first control unit 812 can execute the first software 826 for the visualization module 918 to generate the device visualization 502.

The first control unit 812 can execute the first software 826 for the balancing module 920 to determine the transmission factor 322. The first control unit 812 can execute the first software 826 for the backhaul module 922 to determine the channel type 318. The first control unit 812 can execute the first software 826 for the connection module 924 to communicate the connection response 340. The first control unit 812 can execute the first software 826 for the setup module 926 to establish the backhaul communication 350. The first control unit 812 can execute the first software 826 for the presentation module 928 to display the device visualization 502.

The first control unit 812 can execute the first software 826 for the sink module 1002 to communicate the meta-information 356. The first control unit 812 can execute the first software 826 for the parser module 1004 to determine the content sufficiency 360. The first control unit 812 can execute the first software 826 for the loader module 1006 to install the installation content 358, to generate the pre-cached content 506, or a combination thereof. The first control unit 812 can execute the first software 826 for the group module 1008 to generate the interaction group 238.

The second software 842 of FIG. 8 of the second device 106 of FIG. 8 can include the computing system 100. For example, the second software 842 can include the activity module 902, the context module 904, the scan module 906, the request module 908, the registration module 910, the beacon module 912, the connectivity module 914, the communication module 916, the visualization module 918, the balancing module 920, the backhaul module 922, the connection module 924, the setup module 926, and the presentation module 928. For further example, the second software 842 can include the sink module 1002, the parser module 1004, the loader module 1006, and the group module 1008.

The second control unit 834 of FIG. 8 can execute the second software 842 for the activity module 902 to determine the client presence factor 212. The second control unit 834 can execute the second software 842 for the context module 904 to discover the discovery context 202. The second control unit 834 can execute the second software 842 for the scan module 906 to generate the scan pattern 402.

The second control unit 834 can execute the second software 842 for the request module 908 to transmit the discovery request 302, the information request 354, or a combination thereof. The second control unit 834 can execute the second software 842 for the registration module 910 to register the client presence factor 212. The second control unit 834 can execute the second software 842 for the beacon module 912 to determine the target device coordinate 224.

The second control unit 834 can execute the second software 842 for the connectivity module 914 to determine the device connectivity 316. The second control unit 834 can execute the second software 842 for the communication module 916 to communicate the discovery communication 306. The second control unit 834 can execute the second software 842 for the visualization module 918 to generate the device visualization 502.

The second control unit 834 can execute the second software 842 for the balancing module 920 to determine the transmission factor 322. The second control unit 834 can execute the second software 842 for the backhaul module 922 to determine the channel type 318. The second control unit 834 can execute the second software 842 for the connection module 924 to communicate the connection response 340. The second control unit 834 can execute the second software 842 for the setup module 926 to establish the backhaul communication 350. The second control unit 834 can execute the second software 842 for the presentation module 928 to display the device visualization 502.

The second control unit 834 can execute the second software 842 for the sink module 1002 to communicate the meta-information 356. The second control unit 834 can execute the second software 842 for the parser module 1004 to determine the content sufficiency 360. The second control unit 834 can execute the second software 842 for the loader module 1006 to install the installation content 358, to generate the pre-cached content 506, or a combination thereof. The second control unit 834 can execute the second software 842 for the group module 1008 to generate the interaction group 238.

The third software 866 of FIG. 8 of the third device 108 of FIG. 8 can include the computing system 100. For example, the third software 866 can include the activity module 902, the context module 904, the scan module 906, the request module 908, the registration module 910, the beacon module 912, the connectivity module 914, the communication module 916, the visualization module 918, the balancing module 920, the backhaul module 922, the connection module 924, the setup module 926, and the presentation module 928. For further example, the third software 866 can include the sink module 1002, the parser module 1004, the loader module 1006, and the group module 1008.

The third control unit 852 of FIG. 8 can execute the third software 866 for the activity module 902 to determine the client presence factor 212. The third control unit 852 can execute the third software 866 for the context module 904 to discover the discovery context 202. The third control unit 852 can execute the third software 866 for the scan module 906 to generate the scan pattern 402.

The third control unit 852 can execute the third software 866 for the request module 908 to transmit the discovery request 302, the information request 354, or a combination thereof. The third control unit 852 can execute the third software 866 for the registration module 910 to register the client presence factor 212. The third control unit 852 can execute the third software 866 for the beacon module 912 to determine the target device coordinate 224.

The third control unit 852 can execute the third software 866 for the connectivity module 914 to determine the device connectivity 316. The third control unit 852 can execute the third software 866 for the communication module 916 to communicate the discovery communication 306. The third control unit 852 can execute the third software 866 for the visualization module 918 to generate the device visualization 502.

The third control unit 852 can execute the third software 866 for the balancing module 920 to determine the transmission factor 322. The third control unit 852 can execute the third software 866 for the backhaul module 922 to determine the channel type 318. The third control unit 852 can execute the third software 866 for the connection module 924 to communicate the connection response 340. The third control unit 852 can execute the third software 866 for the setup module 926 to establish the backhaul communication 350. The third control unit 852 can execute the third software 866 for the presentation module 928 to display the device visualization 502.

The third control unit 852 can execute the third software 866 for the sink module 1002 to communicate the meta-information 356. The third control unit 852 can execute the third software 866 for the parser module 1004 to determine the content sufficiency 360. The third control unit 852 can execute the third software 866 for the loader module 1006 to install the installation content 358, to generate the pre-cached content 506, or a combination thereof. The third control unit 852 can execute the third software 866 for the group module 1008 to generate the interaction group 238.

The computing system 100 can be partitioned between the first software 826, the second software 842, and the third software 866. For example, the second software 842 can include the beacon module 912, the connectivity module 914, the communication module 916, the connection module 924, and the sink module 1002. The second control unit 834 can execute modules partitioned on the second software 842 as previously described.

The first software 826 can include the activity module 902, the context module 904, the scan module 906, the request module 908, the registration module 910, the visualization module 918, the balancing module 920, the backhaul module 922, the setup module 926, the presentation module 928, the parser module 1004, the loader module 1006, and the group module 1008. Based on the size of the first storage unit 814 of FIG. 8, the first software 826 can include additional modules of the computing system 100.

The first control unit 812 can execute the modules partitioned on the first software 826 as previously described.

The third software 866 can include the sink module 1002. Based on the size of the third storage unit 864 of FIG. 8, the third software 866 can include additional modules of the computing system 100. The third control unit 852 can execute the modules partitioned on the third software 866 as previously described.

The first control unit 812 can operate the first communication unit 816 of FIG. 8 to communicate the discovery request 302, the discovery communication 306, the information request 354, the meta-information 356, the installation content 358, or a combination thereof to or from the second device 106, the third device 108, or a combination thereof through the communication path 104 of FIG. 8. The first control unit 812 can operate the first software 826 to operate the location unit 820. The second communication unit 836 of FIG. 8 can communicate the discovery request 302, the discovery communication 306, the information request 354, the meta-information 356, the installation content 358, or a combination thereof to or from the first device 102, the third device 108, or a combination thereof through the communication path 104. The third communication unit 856 of FIG. 8 can communicate the discovery request 302, the discovery communication 306, the information request 354, the meta-information 356, the installation content 358, or a combination thereof to or from the first device 102, the second device 106, or a combination thereof through the communication path 104. The first user interface 818, the second user interface 838, or the third user interface 858 can include the display interface 220 of FIG. 2.

The computing system 100 describes the module functions or order as an example. The modules can be partitioned differently. For example, the backhaul module 922 and the setup module 926 can be combined. Each of the modules can operate individually and independently of the other modules. Furthermore, data generated in one module can be used by another module without being directly coupled to each other. For example, the scan module 906 can receive the client presence factor 212 directly from the activity module 902. Further, "communicating" can represent sending, receiving, or a combination thereof the data generated to or from another.

The modules described in this application can be hardware circuitry, hardware implementation, or hardware accelerators in the first control unit 812, the third control unit 852, or in the second control unit 834. The modules can also be hardware circuitry, hardware implementation, or hardware accelerators within the first device 102, the second device 106, or the third device 108 but outside of the first control unit 812, the second control unit 834, or the third control unit 852, respectively as depicted in FIG. 8. However, it is understood that the first control unit 812, the second control unit 834, the third control unit 852, or a combination thereof can collectively refer to all hardware accelerators for the modules.

The modules described in this application can be implemented as instructions stored on a non-transitory computer readable medium to be executed by the first control unit 812, the second control unit 834, the third control unit 852, or a combination thereof. The non-transitory computer medium can include the first storage unit 814 of FIG. 8, the second storage unit 846 of FIG. 8, the third storage unit 854 of FIG. 8, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the computing system 100 or installed as a removable portion of the computing system 100.

The first control flow 900 of FIG. 9 is an embodiment of the present invention. The control flow 900 or a method 900 includes: receiving a discovery request, including a client presence factor, having a scan pattern for discovering a target device in a block 902; determining a target device coordinate with a control unit based on the discovery request for identifying a client device relative to the target device in a block 904; determining a device connectivity based on the target device coordinate, the client presence factor, or a combination thereof for establishing a backhaul communication between the client device and the target device in a block 906; and presenting a device information based on a trust level for displaying the device information of the client device having the device connectivity of connected with the target device in a block 908.

It has been discovered that the computing system 100 receiving the discovery request 302 including the presence factor 212 in the format of the scan pattern 402 improves the accuracy of discovering the target device 206. Based on the discovery request 302, the computing system 100 can determine the target device coordinate 224 for identifying the client device 204 relative to the target device 206. As a result, the computing system 100 can determine the device connectivity 316 for establishing the backhaul channel communication 350 between the client device 204 and the target device 206 and present the device information 314 of FIG. 3 of the client device 204 on the target device 206 with the trust level 522 of trusted.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the embodiment of the present invention is that it valuably supports and services the historical trend of reducing costs, simplifying systems, and increasing performance. These and other valuable aspects of the embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
   a communication unit configured to:
      send a discovery request having a scan pattern with a scan dimension suited for a discovery context,
      receive a discovery communication, including a device connectivity, based on the discovery request, and
   a user interface, coupled to the communication unit, configured to present a device visualization representing an image of a physical area including a device image of a client device, a target device, or a combination thereof based on the discovery communication wherein the image of the physical area representing a micro view or a macro view based on comparing a device distance to a distance threshold; and a control unit, coupled to the user interface, configured to:
determine a channel type of a backhaul channel based on the discovery communication, and
establish a backhaul communication based on the channel type for connecting the client device and the target device for the backhaul communication.

2. The system as claimed in claim 1 wherein the control unit is configured to determine the scan dimension including a pattern shape, a pattern angle, a pattern radius, a pattern height, or a combination thereof for adjusting the scan pattern for the discovery context.

3. The system as claimed in claim 1 wherein the control unit is configured to install an installation content based on a content sufficiency for interacting with the target device, an external device, or a combination thereof.

4. The system as claimed in claim 1 wherein the control unit is configured to generate a pre-cached content based on a client device location within a proximity boundary.

5. The system as claimed in claim 1 wherein the control unit is configured to generate an interaction group having the backhaul communication established for adding another instance of the client device sharing a user's intent.

6. A method of operation of an computing system comprising:
sending a discovery request having a scan pattern with a scan dimension suited for a discovery context;
receiving a discovery communication, including a device connectivity, based on the discovery request;
presenting a device visualization representing an image of a physical area including a device image of a client device, a target device, or a combination thereof based on the discovery communication wherein the image of the physical area representing a micro view or a macro view based on comparing a device distance to a distance threshold;
determining a channel type of a backhaul channel with a control unit based on the discovery communication; and
establishing a backhaul communication based on the channel type for connecting the client device and the target device for the backhaul communication.

7. The method as claimed in claim 6 further comprising determining the scan dimension including a pattern shape, a pattern angle, a pattern radius, a pattern height, or a combination thereof for adjusting the scan pattern for the discovery context.

8. The method as claimed in claim 6 further comprising installing an installation content based on a content sufficiency for downloading the installation content from the target device, an external device, or a combination thereof.

9. The method as claimed in claim 6 further comprising generating a pre-cached content based on a client device location within a proximity boundary.

10. The method as claimed in claim 6 further comprising generating an interaction group having the backhaul communication established for adding another instance of the client device sharing a user's intent.

11. A non-transitory computer readable medium including instructions for execution by a control unit, the instructions comprising:
sending a discovery request having a scan pattern with a scan dimension suited for a discovery context;
receiving a discovery communication, including a device connectivity, based on the discovery request;
presenting a device visualization representing an image of a physical area including a device image of a client device, a target device, or a combination thereof based on the discovery communication wherein the image of the physical area representing a micro view or a macro view based on comparing a device distance to a distance threshold;
determining a channel type of a backhaul channel based on the discovery communication; and
establishing a backhaul communication based on the channel type for connecting the client device and the target device for the backhaul communication.

12. The non-transitory computer readable medium as claimed in claim 11, the instructions further comprising determining the scan dimension including a pattern shape, a pattern angle, a pattern radius, a pattern height, or a combination thereof for adjusting the scan pattern for the discovery context.

13. The non-transitory computer readable medium as claimed in claim 11, the instructions further comprising installing an installation content based on a content sufficiency for downloading the installation content from the target device, an external device, or a combination thereof.

14. The non-transitory computer readable medium as claimed in claim 11, the instructions further comprising generating a pre-cached content based on a client device location within a proximity boundary.

15. The non-transitory computer readable medium as claimed in claim 11, the instructions further comprising generating an interaction group having the backhaul communication established for adding another instance of the client device sharing a user's intent.

* * * * *